(12) United States Patent
Oyman et al.

(10) Patent No.: US 11,991,233 B2
(45) Date of Patent: May 21, 2024

(54) QOE METRICS REPORTING FOR RTP-BASED 360-DEGREE VIDEO DELIVERY

(71) Applicant: Intel Corporation, Santa Clara, CA (US)

(72) Inventors: Ozgur Oyman, San Jose, CA (US); Gang Shen, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/388,132

(22) Filed: Jul. 29, 2021

(65) Prior Publication Data

US 2022/0021723 A1 Jan. 20, 2022

Related U.S. Application Data

(60) Provisional application No. 63/059,736, filed on Jul. 31, 2020, provisional application No. 63/059,061, filed on Jul. 30, 2020.

(51) Int. Cl.
| | |
|---|---|
| *H04L 65/65* | (2022.01) |
| *H04L 43/065* | (2022.01) |
| *H04L 65/70* | (2022.01) |
| *H04L 65/80* | (2022.01) |
| *H04N 13/178* | (2018.01) |
| *H04N 13/344* | (2018.01) |

(52) U.S. Cl.
CPC ............ *H04L 65/65* (2022.05); *H04L 43/065* (2013.01); *H04L 65/70* (2022.05); *H04L 65/80* (2013.01); *H04N 13/178* (2018.05); *H04N 13/344* (2018.05)

(58) Field of Classification Search
None
See application file for complete search history.

(56) References Cited

U.S. PATENT DOCUMENTS

| | | | | |
|---|---|---|---|---|
| 2020/0322395 | A1* | 10/2020 | Copley | .................. H04N 7/157 |
| 2020/0329088 | A1* | 10/2020 | Oyman | ............... H04L 65/1016 |
| 2021/0218790 | A1* | 7/2021 | Ringenberg | ........ H04L 65/1059 |

\* cited by examiner

*Primary Examiner* — Jeffrey R Swearingen
(74) *Attorney, Agent, or Firm* — Schwegman Lundberg & Woessner, P.A.

(57) ABSTRACT

An apparatus and system to provide QoE metrics reporting mechanisms for RTP-based 360-degree video delivery in live immersive streaming and real-time immersive conversational service applications are described for both in-camera and network-based stitching. Initial and desired parameters for viewports used in a teleconference are exchanged, and the teleconference established using 360° media. RTP FoV reports sent during the teleconference each contain viewport orientation information, as well as information for the QoE metrics.

16 Claims, 20 Drawing Sheets

QOE METRICS REPORTING FOR RTP-BASED 360-DEGREE VIDEO DELIVERY

PRIORITY CLAIM

This application claims the benefit of priority under 35 U.S.C. 119(e) to U.S. Provisional Patent Application Ser. No. 63/059,061, filed Jul. 30, 2020, and to U.S. Provisional Patent Application Ser. No. 63/059,736, filed Jul. 31, 2020, each of which is incorporated herein by reference in its entirety.

TECHNICAL FIELD

Embodiments pertain to fifth generation (5G) wireless communications. In particular, some embodiments relate to the Quality of Experience (QoE) Metrics in 5G systems.

BACKGROUND

The use and complexity of wireless systems, which include 4$^{th}$ generation (4G), Long-Term Evolution (LTE), and 5$^{th}$ generation (5G) networks among others, has increased due to both an increase in the types of devices user equipment (UEs) using network resources as well as the amount of data and bandwidth being used by various applications, such as video streaming, operating on these UEs. With the vast increase in number and diversity of communication devices, the corresponding network environment, including routers, switches, bridges, gateways, firewalls, and load balancers, has become increasingly complicated, especially with the advent of next generation (NG) (or new radio (NR) systems). As expected, a number of issues abound with the advent of any new technology.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
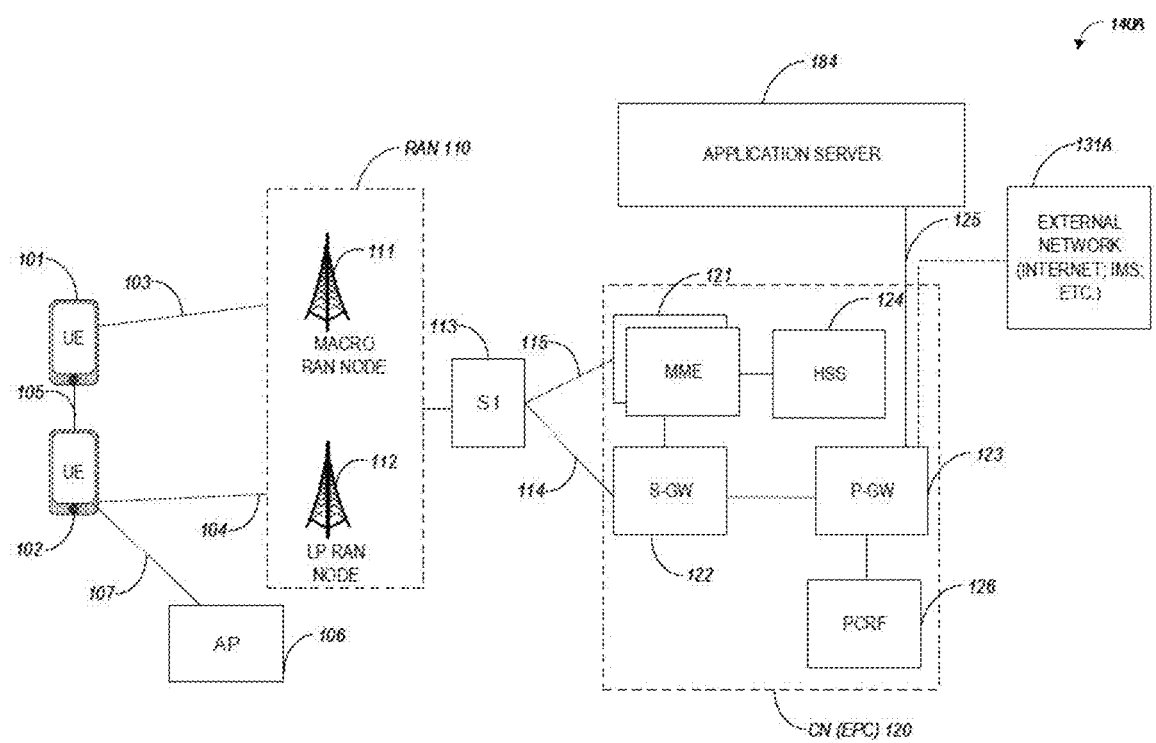
FIG. 1A illustrates an architecture of a network, in accordance with some aspects.

FIG. 1A illustrates an architecture of a network in accordance with some aspects. The network 140A includes 3GPP LTE/4G and NG network functions that may be extended to 6G functions. Accordingly, although 5G will be referred to, it is to be understood that this is to extend as able to 6G structures, systems, and functions. A network function can be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as portable (laptop) or desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and other frequencies and Spectrum Access System (SAS) in 3.55-3.7 GHz and other frequencies). Different Single Carrier or Orthogonal Frequency Domain Multiplexing (OFDM) modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or sonic other type of RAN.

The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a 5G protocol, a 6G protocol, and the like.

In an aspect, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 12.

Any of the RAN nodes 111 and 112 can terminate the air interface protocol and can be the first point of contact for the UEs 101 and 102. In some aspects, raw of the RAN nodes 111 and 112 can fulfill various logical functions for the RAN 110 including, hut not limited to, radio network controller (RNC) functions such as radio bearer management, uplink and downlink dynamic radio resource management and data packet scheduling, and mobility management. In an example, any of the nodes 111 and/or 112 can be a gNB, an eNB, or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (CPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G or 6G network, including 5G new radio network using communications in the licensed (5G NR) and the unlicensed (5G NR-U) spectrum. One of the current enablers of IoT is the narrowband (NB-IoT). Operation in the unlicensed spectrum may include dual connectivity (DC) operation and the standalone LTE system in the unlicensed spectrum, according to which LTE-based technology solely operates in unlicensed spectrum without the use of an "anchor" in the licensed spectrum, called MulteFire. Further enhanced operation of LTE systems in the licensed as well as unlicensed spectrum is expected in future releases and 5G systems. Such enhanced operations can include techniques for sidelink resource allocation and UE processing behaviors for NR sidelink V2X communications.

An NG system architecture (or 6G system architecture) can include the RAN 110 and a 5G network core (5GC) 120. The NG-RAN 110 can include a plurality of nodes, such as gNBs and NG-eNBs. The core network 120 (e.g., a 5G core network/5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes. In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
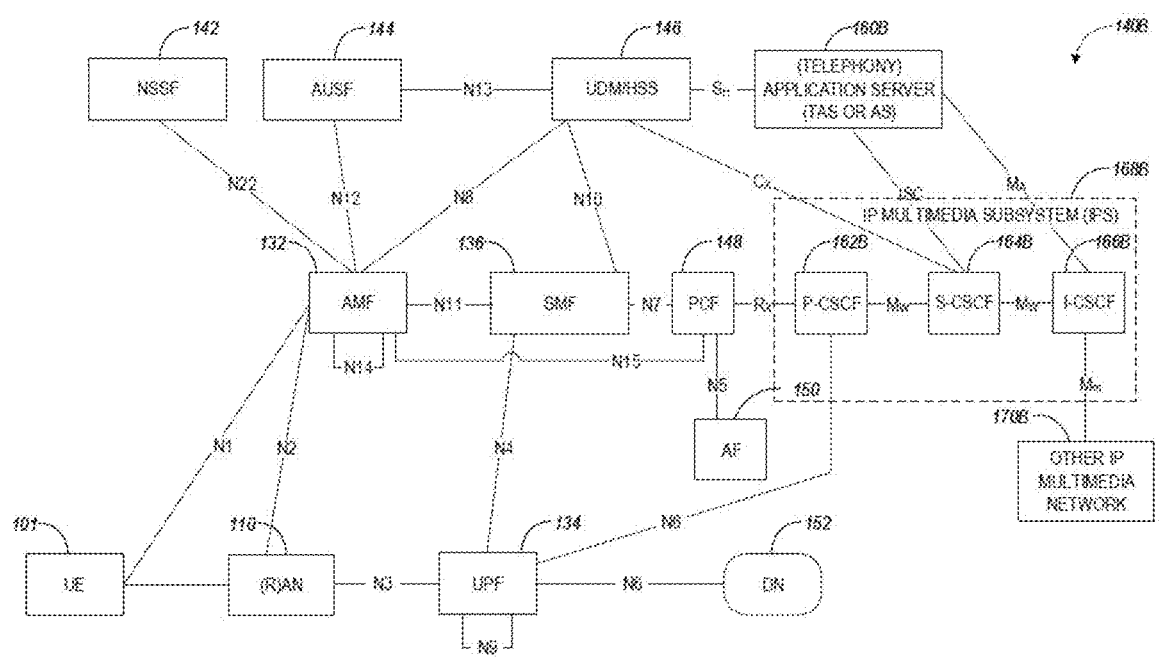
FIG. 1B illustrates a non-roaming 5G system architecture in accordance with some aspects.

FIG. 1B illustrates a non-roaming 5G system architecture in accordance with some aspects. In particular, FIG. 1B illustrates a 5G system architecture 140B in a reference point representation, which may be extended to a 6G system architecture. More specifically, UE 102 can be in communication with RAN 110 as well as one or more other 5GC network entities. The 5G system architecture 140B includes a plurality of network functions (NFs), such as an AMF 132, session management function (SMF) 136, policy control function (PCF) 148, application function (AF) 150, UPF 134, network slice selection function (NSSF) 142, authentication server function (AUSF) 144, and unified data management (UDM)/home subscriber server (HSS) 146.

The UPF 134 can provide a connection to a data network (DN) 152, which can include, for example, operator services, Internet access, or third-party services. The AMF 132 can be used to manage access control and mobility and can also include network slice selection functionality. The AMF 132 may provide UE-based authentication, authorization, mobility management, etc., and may be independent of the access technologies. The SMF 136 can be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 can be deployed in one or more configurations according to the desired service type and may be connected with a data network. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1C can also be used.

Figure 1C:
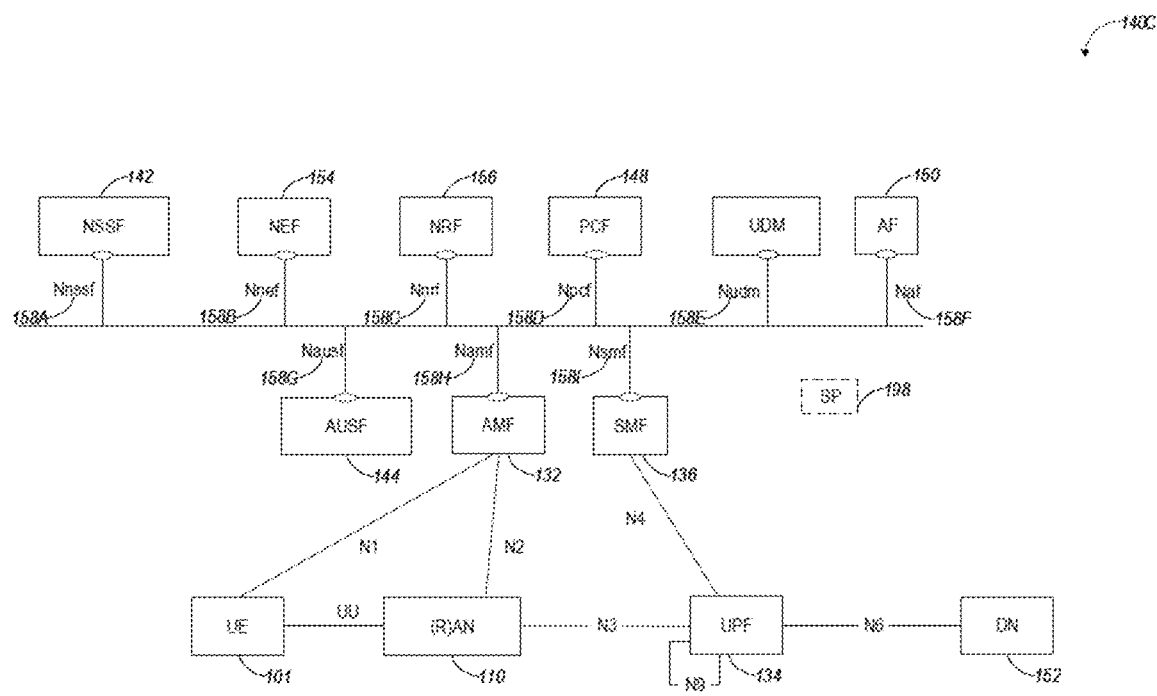
FIG. 1C illustrates a non-roaming 5G system architecture in accordance with some aspects.

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158E (a service-based interface exhibited by the AUSF 144). Other service-based interfaces (e.g., Nudr, N5g-eir, and Nudsf) not shown in FIG. 1C can also be used.

NR-V2X architectures may support high-reliability low latency sidelink communications with a variety of traffic patterns, including periodic and aperiodic communications with random packet arrival time and size. Techniques disclosed herein can be used for supporting high reliability in distributed communication systems with dynamic topologies, including sidelink NR V2X communication systems.

Figure 2:
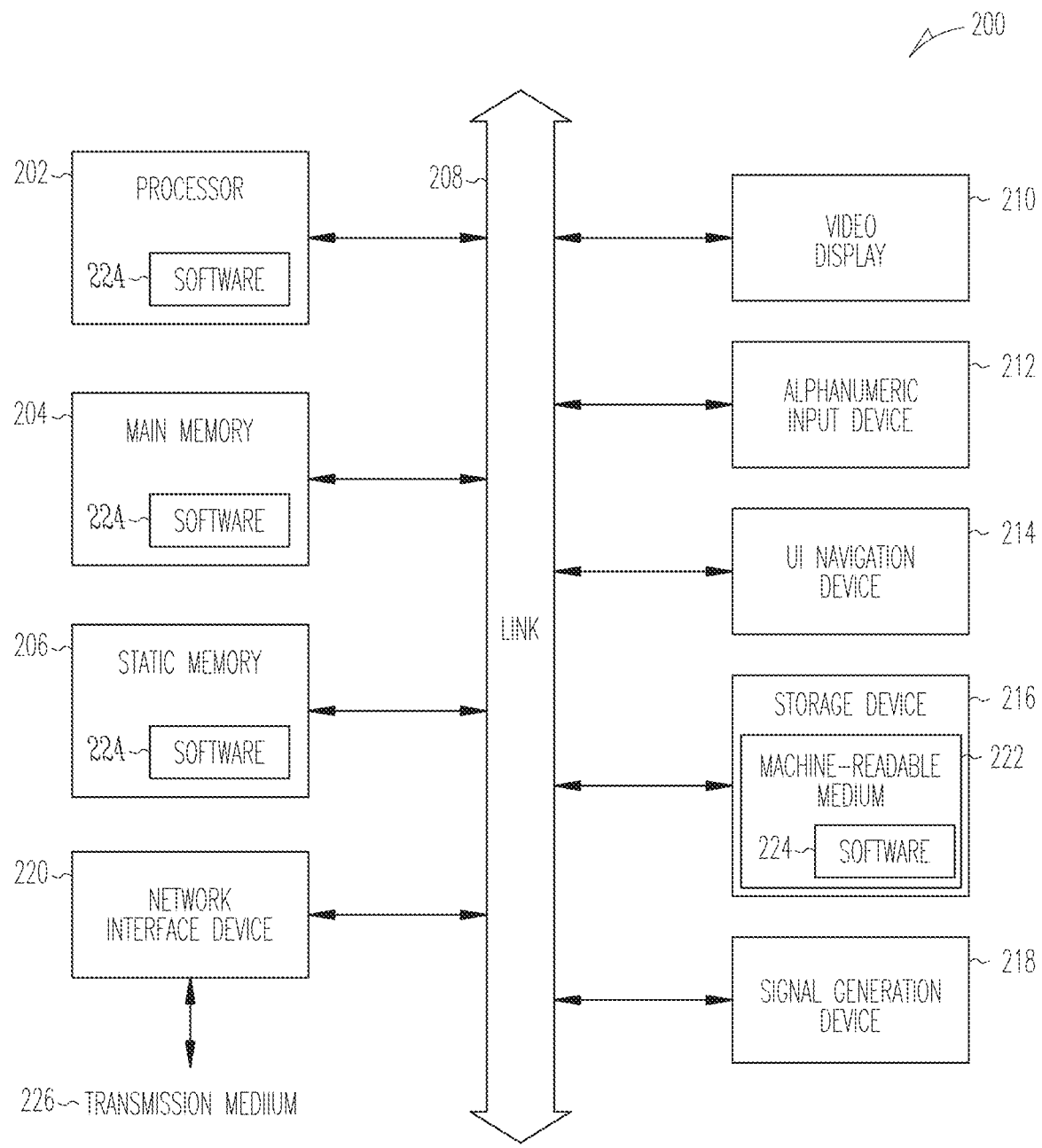
FIG. 2 illustrates a block diagram of a communication device in accordance with some embodiments.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIGS. 1A-1C. Note that communications described herein may be encoded before transmission by the transmitting entity (e.g., UE, gNB) for reception by the receiving entity (e.g., gNB, UE) and decoded after reception by the receiving entity.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules may be instantiated at different moments in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; random access memory (RAM); and CD-ROM and DVD-ROM disks.

The instructions 224 may further be transmitted or received over a communications network using a transmission medium 226 via the network interface device 220 utilizing any one of a number of wireless local area network (WLAN) transfer protocols (e.g., frame relay, interact protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/$5^{th}$ generation (5G) standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD). Time Division-Code Division Multiple Access (TD-CDMA), Time Division-Synchronous Code Division. Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19. etc.), 3GPP 5G, 5G, 5G New Radio (5G NR), 3GPP 5G New Radio, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 1302.11ad, IEEE 802.11ay, etc.), technologies operating above 300 GHz and THz bands, (3GPP/LTE based or IEEE 802.11p or IEEE 802.11bd and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz or above (typically up to 5935 MHz following change proposals in CEPT Report 71)), the European ITS-G5 system (i.e. the European flavor of IEEE 802.11p based DSRC, including ITS-GSA (i.e., Operation of ITS-G5 in European ITS frequency bands dedicated to ITS for safety re-fated applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHz), IEEE 802.11bd based systems, etc.

Aspects described herein can be used in the context of any spectrum management scheme including dedicated licensed spectrum, unlicensed spectrum, license exempt spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHz, 610-790 MHz, 3400-3600 MHz, 3400-3800 MHz, 3800-4200 MHz, 3.55-3.7 GHz (note: allocated for example in the US for Citizen Broadband Radio Service), 5.15-5.25 GHz and 5.25-5.35 (kHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz: (note: allocated for example in South Korea, 5925-7125 MHz and 5925-6425 MHz band (note: under consideration in US and EU, respectively. Next generation Wi-Fi system is expected to include the 6 GHz spectrum as operating band but it is noted that, as of December 2017, Wi-Fi system is not yet allowed in this band. Regulation is expected to be finished in 2019-2020 time frame), IMT-advanced spectrum, IMT-2020 spectrum (expected to include 3600-3800 MHz, 3800-4200 MHz, 3.5 GHz bands, 700 MHz bands, bands within the 24.25-86 GHz range, etc.), spectrum made available wider FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (note: this band has near-global designation for Multi-Gigabit Wireless Systems (MGWS)/WiGig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

New QoE metrics reporting mechanisms for Real-Time Transport Protocol (RTP)-based 360-degree video delivery in live immersive streaming and real-time immersive conversational service applications are disclosed.

Figure 3:
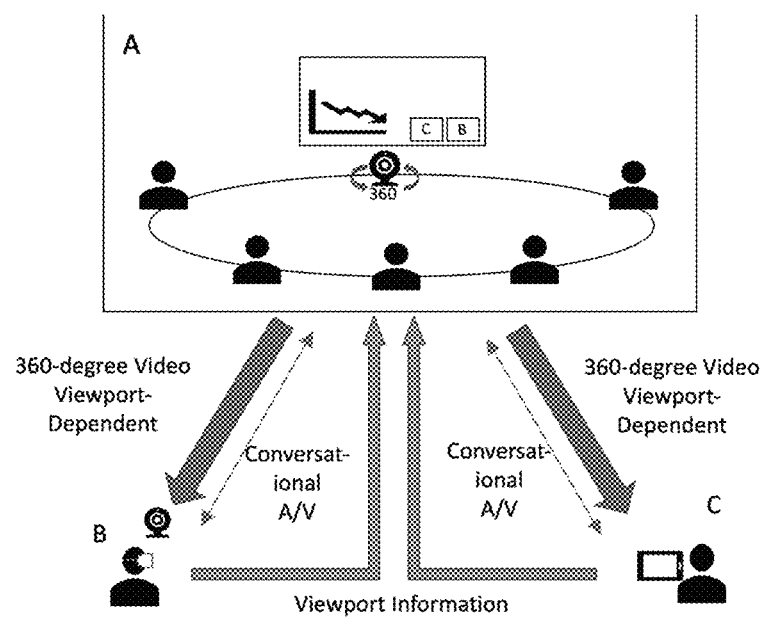
FIG. 3 illustrates a 360-degree conference call in accordance with some embodiments.

FIG. 3 illustrates a 360-degree conference call in accordance with some embodiments. In one use case, a group of colleagues are having a meeting in conference room A. The room consists of a conference table (for physically present participants), a 360-degree camera, and a view screen. The system supports transmission of full 360 video. However, the use cases may restrict the field of view to enhance user experience. Two of their colleagues, Bonnie (B) and Clyde (C) are travelling and join the meeting through a conference call.

Participants in conference room A use the screen to display a shared presentation and/or video streams coming from Bonnie and Clyde. Bonnie joins the conference from her home using a Head Mounted Display (HMD) and a camera that captures her video. She has a 360-degree view of the conference room. Clyde joins the conference from the airport using his mobile phone. He also has a 360-degree view of the conference room on his mobile screen and uses his mobile camera for capturing his own video.

Both Bonnie and Clyde can see the screen in the conference room as part of the 360-degree video. They also have the option to bring into focus any of the incoming video streams (presentation or the other remote participant's camera feed) using their own display devices. The manner in which this focused stream is displayed is a function of their display device and is not covered in this use case. This is notable as, in some cases, only a portion of the content may be transmitted for viewing on a viewport.

Within the 3GPP MTSI TS 26.114 and Telepresence TS 26.223 specifications, the above use case can be realized in two possible configurations, which are explained below. The participants are referred to as A, B and C from here onwards. In the first scenario, shown in FIG. 3, the call is set up without the support of any media-aware network elements. Both remote participants, B and C, send information about their viewport (e.g., VR goggles) orientation to A, which in turn sends them a viewport-dependent video stream from the omnidirectional camera.

Figure 4:
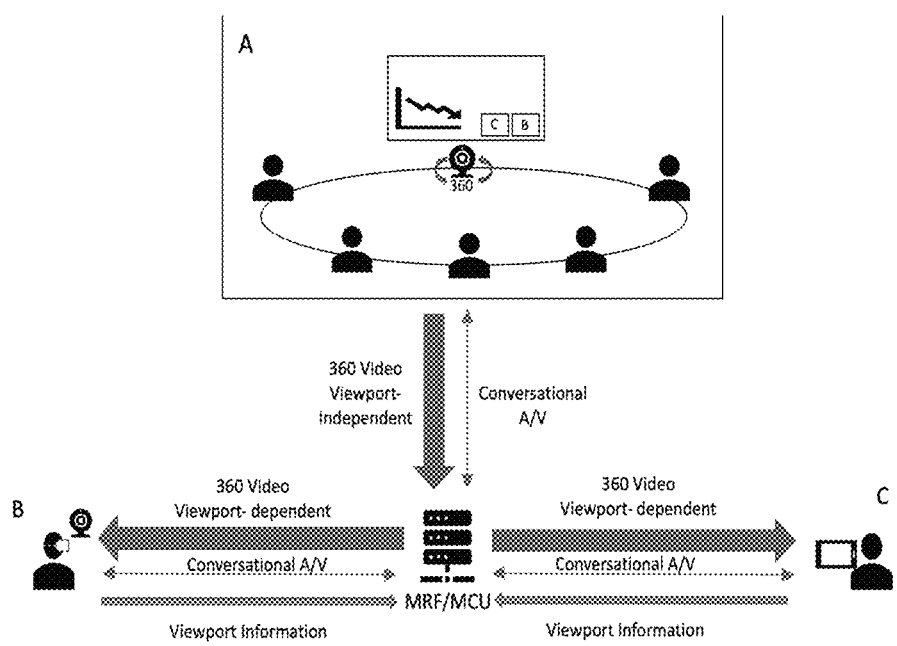
FIG. 4 illustrates a 360-degree conference call via Media Resource Function (MRF)/Media Control Unit (MCU) in accordance with some embodiments.

In a second scenario, the call is setup using a network function, which may be performed by either a Media Resource Function (MRF) or a Media Control Unit (MCU). In this case, the MRF/MCU receives a viewport-independent stream from A. Both B and C, send viewport orientation information to the MRF/MCU and receive viewport-dependent streams from it. FIG. 4 illustrates a 360-degree conference call via MRF/MCU in accordance with some embodiments. The A/V channel for conversational non-immersive content also flows through MRF/MCU in the figure. However, it should be possible to maintain this channel directly between the conference call participants.

The use case aims to enable immersive experience for remote terminals joining teleconferencing and telepresence sessions, with two-way audio and one-way immersive video, e.g., a remote single user wearing an HMD participates to a conference will send audio and optionally 2D video (e.g., of a presentation, screen sharing and/or a capture of the user itself), but receives stereo or immersive voice/audio and immersive video captured by an omnidirectional camera in a conference room connected to a fixed network. Furthermore:

Multiple single-user participants are allowed. Communications between the single users can be conventional MTSI/Telepresence communications. MSMTSI could be used, and if that is used, then media data can be transmitted in separate media streams, and the layout of different participants is up to the client application/implementation.

One 360 camera per location in multi-party conference scenarios involving multiple physical locations are allowed.

Conditions

Both in-camera stitching and network-based stitching are allowed. In case of camera stitching, stitched immersive video is sent from the conference room to the conferencing server (e.g., MSMTSI MRF or any other media gateway) and then from the conferencing server to the remote participants. If this is a one-to-one conversational session between the conference room and the remote participant, a media gateway in the middle may or may not be used. In case of network-based stitching, different 2D captures are sent from the conference room to the conferencing server and the conferencing server performs decoding, stitching, and re-encoding to produce the immersive video, which is then distributed to the remote participants.

In this case, multiple single-user participants are supported. Communications between the single users can be conventional MTSI/Telepresence communications. MSMTSI could be used, and if that is used, then media data can be transmitted in separate media streams, and the layout of different participants is up to the client application/implementation. One 360 camera per location in multi-party conference scenarios involving multiple physical locations are allowed. Both in-camera stitching and network-based stitching are supported. In case of camera stitching, stitched immersive video is sent from the conference room to the conferencing server e.g., MSMTSI MRF or any other media gateway) and then from the conferencing server to the remote participants. If this is a one-to-one conversational session between the conferencing room and the remote participant, a media gateway in the middle may be avoided. In case of network-based stitching, different 2D captures are sent from the conference room to the conferencing server and the conferencing server performs decoding, stitching, and re-encoding to produce the immersive video, which is then distributed to the remote participants.

It is recommended that MTSI and IMS Telepresence endpoints support codec, protocol and transport capabilities relevant for encoding, delivery and consumption of immersive speech/audio and immersive video. Capability for the party that sends 360-degree video to send viewport-dependent and/or viewport-independent streams. Timely delivery of the Changes in viewport orientation from the remote participants, and appropriate low-delay actions to update the viewport-dependent streams. Any changes in viewport orientation should not lead to latency-prone signalling, such as SIP renegotiations. Capability to create viewport-dependent streams for individual UEs including a larger area of the original viewport for safe playback in the UE. A suitable coordinate system to be used as the standard way of communicating the orientation of the viewport. Given possible end device limitations as well as potential constraints on the conference room equipment, network-based processing should be considered for media workloads involving both conference room and remote participants, e.g., stitching of captured streams from the conference room, media composition, transcoding and prerendering for the remote participant, etc.

The following parameters are to be signalled in the SDP during call setup in addition to normal MTSI call signaling: Initial viewport orientation. It is the default orientation from which to start the view at the receivers' side. Decoding/Rendering metadata, e.g., region-wise packing information, projection mapping information, frame packing information, etc. It is subject of discussion whether this information is signaled via SDP and/or within SEI messages with the media stream. Capture Field-of-View (CFoV): as discussed in the use case, the system supports transmission of 360-degree video. However, the range of the FoV may be restricted in order to enhance user experience. The negotiation uses signaling the capture FoV of the capture device, and a response carrying the receiver's preferred FoV (PFoV) depending on the remote UE, where the preferred FoV will be less than or equal to the captured FoV. Codec negotiation.

Figure 5:
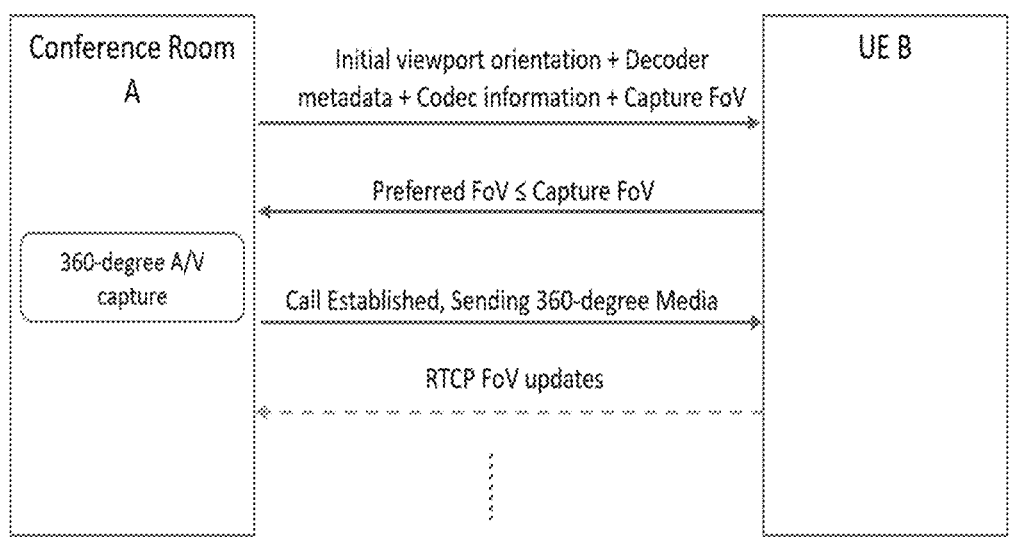
FIG. 5 illustrates signalling flow for a 360-degree conference call with unidirectional 360-degree video from A to B in accordance with some embodiments.

FIG. 5 illustrates signalling flow for a 360-degree conference call with unidirectional 360-degree video from A to B in accordance with some embodiments. The high level signaling flows are depicted in FIG. 5.

Once the call has been established, remote parties (B or C) can send viewport orientation information using RTP Control Protocol (RTCP) reports with yaw, pitch and roll data. These may be sent at fixed intervals or event-based, triggered by changes in viewport orientation or hybrid combination of fixed interval and event-based triggers. When hybrid reporting scheme is used, the event-based feedback is triggered by any changes in viewport whereas the regular RTCP interval provides the sender with a regular update, in fixed intervals, of the viewport even if the event-based feedback is not received. The most efficient RTCP reporting scheme for viewport orientation information is for further study.

Capability to support the interaction where all media types will be presented to certain users and a subset of the media types are presented to the others.

Capability for the participant in room A with his or her own display device to receive a viewport independent or viewport dependent video from omnidirectional camera in room A.

Capability for the remote party to share a viewport dependent video stream with embedded viewport metadata to another remote participant.

Capability for the participant in room A with his or her own display device to follow remote participant viewport presentation.

The capability to place overlays in the 360-degree video either within the device or pre-rendered through a network element.

Transmission from sender to receiver of the coordinates of the location of the overlay (e.g. a presentation): this is used to give flexibility in the overlay placement at the receiver's side. By sender/receiver it is meant either one of the parties or the MRF/MCU.

Avoid that the overlaid background content is transmitted unnecessarily at high quality within the user viewport: this is one issue overlays cause to viewport-dependent streaming. The content in the viewport is always streamed at higher quality. However, when an overlay with different content is sticked on top of (part of) the viewport, the content behind the overlay may or may not be sent at higher quality. This allows saving bandwidth or increase the quality in the viewport for the non-overlaid parts.

Enable some form of interaction with the overlay (e.g., moving or rotating the overlay, resizing it, switching it on/off, etc.): these are basic and simple ways to interact with the overlay, to increase flexibility and utility of an overlay.

Capability for users to receive an incoming interaction message (e.g., SMS, chat message, voice call or audio-visual call) from other users as an overlay: this is a good way to allow integration of other 3GPP services and applications into ITT4RT/MTSI applications in order to increase the value of the first VR applications for 3GPP.

To facilitate network-based stitching, it is possible to signal camera calibration parameters for each 2D video capture (i.e., each camera lens) transported from the conference room to the conferencing server at the beginning of each session. Relevant intrinsic and extrinsic camera parameters can include lens numbers, layouts, positions, angles, radius, distortion, entrance pupil and resolutions.

Signalling for setting, unsetting or negotiating a margin area that extends on any or all of the sides of the viewport.

The maximum extent of the margins: a sender may indicate the maximum extent of the margins and a receiver may want to limit the maximum extent of the margin area to indicate a preference for high quality viewport.

An RTP receiver should be able to signal higher-level metrics such as Motion to High-Quality Delay to the sender to assist in bandwidth adaptation and monitoring.

Architecture

The current MTSI service architecture depicted in FIG. 4.1 of TS 26.114 is applicable for immersive teleconferencing. No further architectural gaps are identified. In terms of the reuse of existing MTSI functionality, the following may be observed:

For in-camera stitching, stitched immersive video is sent from the conferencing room to the conferencing server (e.g., MSMTSI MRF) or directly to the remote participant (e.g., one-to-one conversation) in one or more RTP streams (e.g., established via SDP). Multiple RTP streams may be used in case tile or sub-picture based delivery optimization is in use.

For network-based stitching, multiple RTP streams are established (e.g., via SDP, using MSMTSI) between the conferencing server and conference room, each of which carries a particular 2D capture. These RTP streams are then sent from the conference room to the conferencing server and the conferencing server performs decoding, stitching, and re-encoding to produce one or more RTP streams containing the immersive video, which are then distributed to the remote participants (e.g., again via MSMTSI). Multiple RTP streams may be used for the immersive video in case tile or sub-picture based delivery optimization is in use.

Potential Solutions

Figure 6:
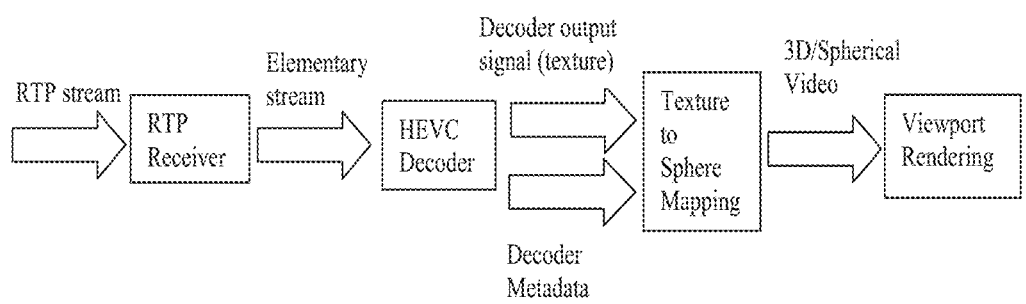
FIG. 6 illustrates a receiver architecture for virtual reality (VR) support over Multimedia Telephony Service for Internet Protocol (IP) Multimedia Subsystem (IMS) (MTSI) and IMS Telepresence in accordance with some embodiments.

FIG. 6 illustrates a receiver architecture for VR support over MTSI and IMS Telepresence in accordance with some embodiments. FIG. 6 provides an overview of a possible receiver architecture that reconstructs the spherical video in an MTSI or IMS Telepresence UE. Note that this figure does not represent an actual implementation, but a logical set of receiver functions. Based on one or more received RTP media streams, the UE parses, possibly decrypts and feeds the elementary stream to the HEVC decoder. The HEVC decoder obtains the decoder output signal, referred to as the "texture", as well as the decoder metadata. The Decoder Metadata contains the Supplemental Information Enhancement (SEI) messages, i.e., information carried in the omnidirectional video specific SEI messages, to be used in the rendering phase. In particular, the Decoder Metadata may be used by the Texture-to-Sphere Mapping function to generate a spherical video (or part thereof) based on the decoded output signal, i.e., the texture. The viewport is then generated from the spherical video signal (or part thereof) by taking into account the viewport position information from sensors, display characteristics as well as possibly other metadata such as initial viewport information.

For 360 degree video, the potential solutions can consider the following principles:

The RTP stream would contain an HEVC bitstream with omnidirectional video specific SEI messages. In particular, the omnidirectional video specific SEI messages as defined in ISO/IEC 23008-2 may be present.

The video elementary stream(s) may be encoded following the indications in the Omnidirectional Media Format (OMAF) specification ISO/TEC 23090-2, clause 10.1.2.2.

Relevant SEI messages contained in the elementary stream(s) with decoder rendering metadata may include the following information as per ISO/IEC 23008-2:

Region-wise packing information, e.g., carrying region-wise packing format indication and also any coverage restrictions Projection mapping information, indicating the projection format in use, e.g., Equi-Rectangular Projection (ERP) or Cubemap projection (CMP)

Padding, indicating whether there is padding or guard band in the packed picture Frame packing arrangement, indicating the frame packing format for stereoscopic content Content pre-rotation information, indicating the amount of sphere rotation, if any, applied to the sphere signal before projection and region-wise packing at the encoder side The output signal, i.e., the decoded picture or "texture", is then rendered using the Decoder Metadata information contained in relevant SEI messages contained in the video elementary streams. The Decoder Metadata is used when performing rendering operations such as region-wise unpacking, projection de-mapping and rotation toward creating spherical content for each eye.

Viewport-dependent processing could be supported for both point-to-point conversational sessions and multiparty conferencing scenarios and be achieved by sending from the MTSI receiver RTCP feedback or RTP header extension messages with the desired viewport information and then encoding and sending the corresponding viewport by the MTSI sender or by the media gateway, e.g., MRF. This is expected to deliver resolutions higher than the viewport independent approach for the desired viewport. The transmitted RTP stream from the MTSI sender or media gateway may also include the actual viewport or coverage information, e.g., in an RTP header extension message, as the 360 degree video generated, encoded and streamed by the sender may cover a larger area than the desired viewport. The media formats for tiling and sub-picture coding as described in the viewport-dependent profile of OMAF in ISO/IEC 23090-2 etc. are not relevant for the 5G conversational setting. Instead, viewport-dependent processing based on tiling and sub-picture coding could be realized via RTP/RTCP based protocols that are supported by MTSI and IMS-based telepresence.

OMAF video profiles specified in ISO/IEC 23090-2 are based on HEVC Main 10 Profile, Main Tier, Level 5.1 to deliver high quality VR experiences. In the meantime, MIST in TS 26.114 mandates H.265 (HEVC) Main Profile, Main Tier, Level 3.1 for video, and IMS telepresence in TS 26.223 mandates H.265 (HEVC) Main Profile, Main Tier, Level 4.1 for video.

For achieving video quality desired by VR services, it may be recommended that the video codecs for VR support in MTSI and IMS telepresence are aligned with OMAF and/or TS 26.118, e.g., HEVC Main 10 Profile, Main Tier, Level 5.1 may be recommended for MTSI and IMS telepresence in TS 26.114 and TS 26.223 to ensure a high-quality VR experience. It is expected that both MTSI client and MTSI gateway codec limitations are aligned with these recommended video codec limitations for VR support. It is not expected that the mechanisms for session setup and negotiation would be different because of this changed limitation on video codecs.

With regards to the negotiation of SEI messages for carriage of decoder rendering metadata, procedures specified in IETF RFC 7798 on the RTP payload format for HEVC may be reused. In particular, RFC 7798 can allow exposing SEI messages related to decoder rendering metadata for omnidirectional media in the SDP using the 'sprop-sei' parameter, which allows to convey one or more SEI messages that describe bitstream characteristics. When present, a decoder can rely on the bitstream characteristics that are described in the SEI messages for the entire duration of the session. Intentionally, RFC 7798 does not list an applicable or inapplicable SEI messages to be listed as part of this parameter, so the newly defined SEI messages for omnidirectional media in ISO/IEC 23008-2 can be signaled. It is expected that both MTSI clients and MIST gateways support RTP payload formats for VR support.

For most one-to-one video telephony and multi-party video conferencing scenarios, it is expected that support of the following omnidirectional video specific SEI messages would be sufficient: the equirectangular projection SEI message, the cubemap projection SEI message, the sphere rotation SEI message, and the region-wise packing SEI message.

For stereoscopic video support, in either one-to-one video telephony scenarios or multi-party video conferencing scenarios, support of a subset of the frame packing arrangement SEI message as in ISO/IEC 23090-2 is also used.

Based on the above, an SDP framework for immersive video exchange is to be developed to negotiate codec support, SEI messages for decoder rendering metadata as well as RTP/RTCP signaling for viewport dependent processing. These capabilities may be individually negotiated, but to simplify the SDP exchange and avoid fragmentation of capabilities it would be more preferable to specify one or more MTSI client profiles and develop the SDP framework based on these profiles.

Such an example compact SDP negotiation framework is described below.

A new SDP attribute 3gpp_360video may be defined with the following ABNF:

3gpp_360video="a=3gpp_video:" [SP "VDP" SP "Stereo"]

A potential specification for the semantics of the above attribute and parameter is provided below. Unsupported parameters of the 3gpp_360video attribute may be ignored.

An MTSI terminal supporting the 360 video feature without using viewport-dependent processing (VDP) or stereoscopic video for video may support the following procedures:
  when sending an SDP offer, the MTSI client includes the 3gpp_360video attribute in the media description for video in the SDP offer
  when sending an SDP answer, the MTSI client includes the 3gpp_360video attribute in the media description for video in the SDP answer if the 3gpp_360video attribute was received in an SDP offer
  after successful negotiation of the 3gpp_360video attribute in the SDP, for the video streams based on the HEVC codec, the MTSI clients exchange an RTP-based video stream containing an HEVC bitstream with omnidirectional video specific SEI messages as defined in ISO/IEC 23008-2 with the following characteristics: OMAF video profiles specified in ISO/TEC 23090-2 are based on HEVC Main 10 Profile, Main Tier, Level 5.1 are supported. Exchange of the following SEI messages are supported: (i) the equirectangular projection SEI message, (ii) the cubemap projection SEI message, (iii) the sphere rotation SEI message, and (iv) the region-wise packing SEI message. This attribute may be used to negotiate 360 video capabilities for video streams in a codec-agnostic fashion. The semantics of 3gpp_360video attribute for video streams based on AVC (which is the other mandatory codec for MTSI) is TBD.

An MTSI terminal supporting the 360 video feature supporting use of viewport-dependent processing (VDP) would include the VDP parameter and further support the following procedures:
  the RTCP feedback (FB) message described in clause 9.2 type to carry desired or requested viewport information during the RTP streaming of media (signaled from the MTSI receiver to the MTSI sender). When the predefined viewport mode of viewport-dependent processing is negotiated, additional SDP attributes may be signaled in addition to VDP, e.g., as per a=predefined_viewport attribute described in clause 9.4.

the new RTP header extension type described in clause 9.3 to carry actually transmitted viewport information during the RTP streaming of media (signaled from the MTSI sender to the MTSI receiver).

An MTSI terminal supporting the 360 video feature with stereoscopic video would include the Stereo parameter and additionally support frame packing arrangement SEI message as in ISO/IEC 23090-2 for HEVC.

Example Signaling Flows and Media Processing Procedures

Immersive Teleconferencing with In-Camera Stitching

Figure 7:
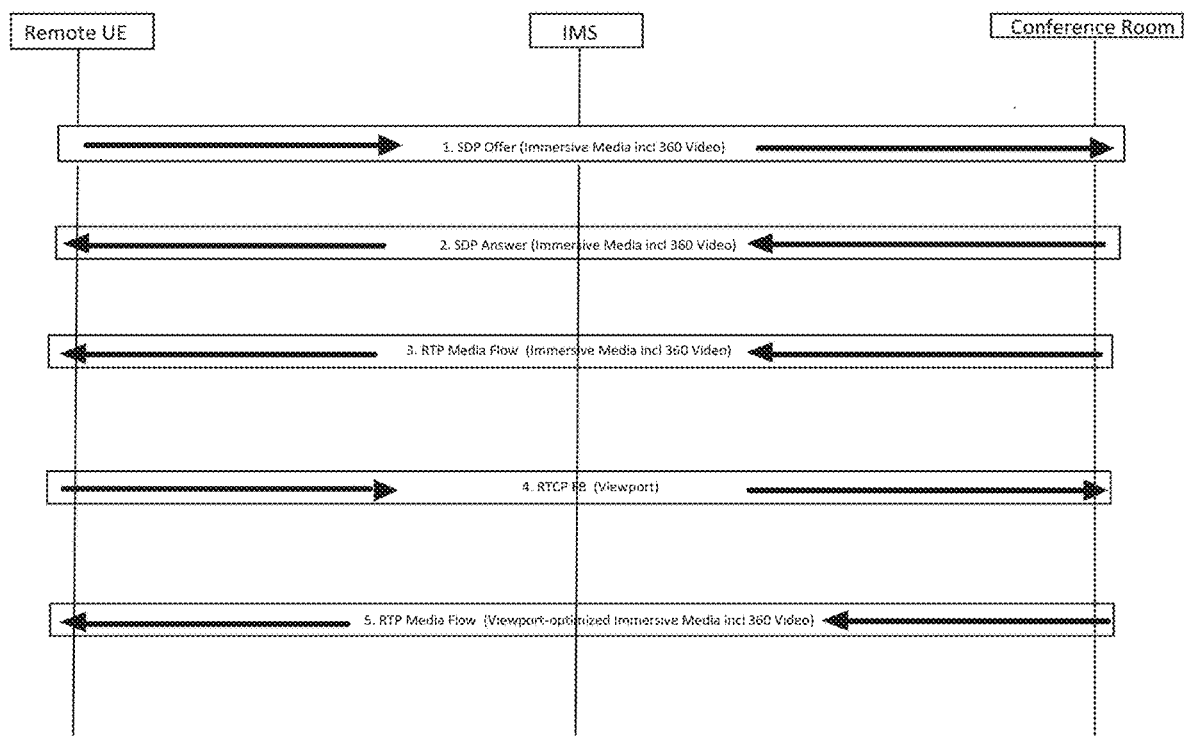
FIG. 7 illustrates a signaling flow for immersive conferencing with in-camera stitching in accordance with some embodiments.

For in-camera stitching, stitched immersive video is sent from the conferencing room to the conferencing server (e.g., MSMTSI MRF) or directly to the remote participant (e.g., one-to-one conversation) in one or more RTP streams (e.g., established via SDP). Multiple RTP streams may be used in case tile or sub-picture based delivery optimization is in use. We consider a point to point communications scenario in this example so there is no conferencing server in between. FIG. 7 illustrates a signaling flow for immersive conferencing with in-camera stitching in accordance with some embodiments.

1—The Remote Participant UE sends an SDP offer to the Conference Room Terminal indicating immersive media capabilities including 360 video support. Optionally, the Remote Participant UE may also include viewport-dependent processing capability in the SDP offer. Two or more RTP streams may be included in the SDP offer in case viewport-dependent processing is offered, e.g. one RTP stream for the base 360 video and another viewport-optimized RTP stream, with the high quality 360 video corresponding to the desired viewport.

2—The Conference Room Terminal responds to the Remote Participant UE with an SDP answer confirming immersive media capabilities including 360 video support. Optionally, the Conference Room Terminal may also accept viewport-dependent processing capability in the SDP answer. In case viewport-dependent processing is accepted, the SDP answer from the Conference Room Terminal may include multiple RTP streams.

3—The Conference Room Terminal streams the RTP media flow with immersive media including 360 video to the Remote Participant UE 360 video transmission could be based on the RTP payload formats for HEVC that carry SEI messages describing immersive media metadata.

4—(Optional) The Remote Participant UE signals the desired Viewport Information to the Conference Room Terminal using a dedicated RTCP feedback message.

5—(Optional) The Conference Room Terminal streams the viewport-optimized RTP media flow with immersive media including 360 video to the Remote Participant UE. Information on the actually transmitted viewport may also be included in the RTP media flow. In case two RTP streams are negotiated, then the viewport-optimized RTP stream containing the high quality 360 video may contain this information.

8.2 Immersive Teleconferencing with Network-Based Stitching

Figure 8:
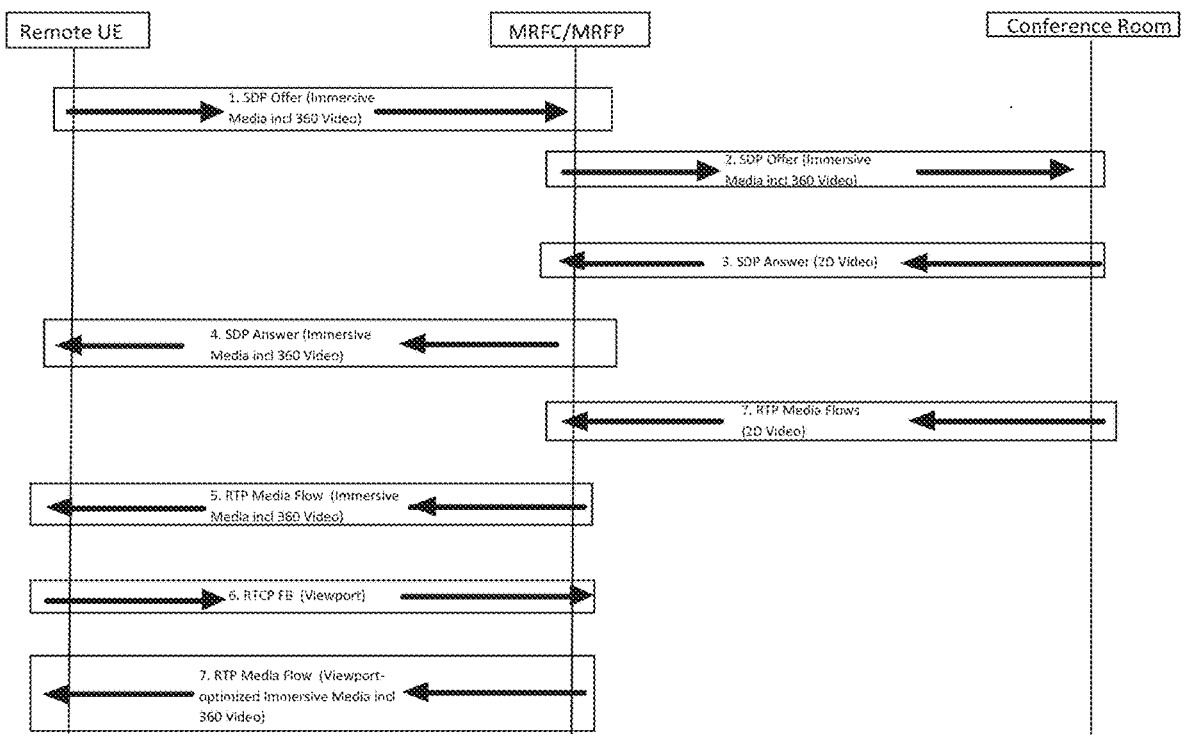
FIG. 8 illustrates a signaling flow for immersive conferencing with network-based stitching in accordance with sonic embodiments.

For network-based stitching, multiple RTP streams are established (e.g., via SDP, using MSMTSI) between the conferencing server and conference room, each of which carries a particular 2D capture. These RTP streams are then sent from the conference room to the conferencing server and the conferencing server performs decoding, stitching, and re-encoding to produce one or more RTP streams containing the immersive video, which are then distributed to the remote participants (e.g., again via MSMTSI). Multiple RTP streams may be used for the immersive video in case tile or sub-picture based delivery optimization is in use. FIG. 8 illustrates a signaling flow for immersive conferencing with network-based stitching in accordance with some embodiments.

1—The Remote Participant UE sends an SDP offer to the Conferencing Server (e.g., MSMTSI MRF) indicating immersive media capabilities including 360 video support. Optionally, the Remote Participant UE may also include viewport-dependent processing capability in the SDP offer. Two or more RTP streams may be included in the SDP offer in case viewport-dependent processing is offered, e.g. one RTP stream for the base 360 video and another viewport-optimized RTP stream, with the high quality 360 video corresponding to the desired viewport.

2—The Conferencing Server forwards the SDP offer to the Conference Room Terminal to see it is capable of supporting immersive media. The SDP offer also indicates 2D video capabilities as a fallback in case the Conference Room Terminal is not capable of immersive media support. Multiple RTP streams may be included in the SDP offer.

3—The offered media is rejected by the Conference Room Terminal indicating that it has no support for immersive media. Instead, the Conference Room Terminal sends an SDP answer to the Conferencing Server indicating its 2D video capabilities. Multiple RTP streams may be included in the SDP answer depending on the capture capabilities of the conference room.

4—The Conferencing Server responds to the Remote Participant UE with an SDP answer confirming immersive media capabilities including 360 video support. Optionally, the Conference Room Terminal may also accept viewport-dependent processing capability in the SDP answer. In case viewport-dependent processing is accepted, the SDP answer from the Conference Room Terminal may include multiple RTP streams.

5—The Conference Room Terminal streams multiple RTP media flows carrying 2D video to the Conferencing Server.

6—The Conferencing Server stitches the received 2D videos to generate immersive media including 360 video and streams it to the Remote Participant UE. 360 video transmission could be based on the RTP payload formats for HEVC that carry SEI messages describing immersive media metadata.

7—(Optional) The Remote Participant UE signals the desired Viewport Information to the Conferencing Server using a dedicated RTCP feedback message.

8—(Optional) The Conferencing Server streams the viewport-optimized RTP media flow with immersive media including 360 video to the Remote Participant UE. Information on the actually transmitted viewport may also be included in the RTP media flow. In case two RTP streams are negotiated, then the viewport-optimized RTP stream containing the high quality 360 video may contain this information.

Metrics Reporting Framework in 3GPP TS 26.114

The MTSI Quality of Experience (QoE) metrics feature is optional for an MTSI client in a terminal and may not disturb the MTSI service. Non-terminal MTSI clients (such as gateways) should not implement MTSI QoE reporting. An MTSI client that supports the QoE metrics feature may support OMA-DM. The OMA-DM configuration server can configure the activation/deactivation and gathering of QoE metrics in the MIST client (see clause 16.3). Configuration can also be done using the QMC functionality (see clause 16.5). An MTSI client supporting the QoE metrics feature may perform the quality measurements in accordance to the measurement definitions, aggregate them into client QoE metrics and report the metrics. The MTSI client may send QoE metrics reports during the session and at the end of the session. The way how the QoE metrics are processed and made available is out of the scope of this specification.

An MTSI client supporting the QoE metrics feature may support the OMA-DM solution specified in this clause for configuration of QoE metrics and their activation. The MTSI client may also support the QMC functionality specified in clause 16.5 for configuration of QoE metrics.

The QoE configuration may only be checked by the client when each session starts, and thus all logging and reporting criterias for an ongoing session may be unaffected by any QoE configuration changes received during that session. This also includes evaluation of any filtering criterias, such as geographical filtering, which may only be done when the session starts. Thus changes to the QoE configuration will only affect sessions started after these configuration changes have been received.

If an MTSI client uses the OMA-DM configuration feature, it is mandatory for the MTSI client to implement the Management Object (MO) as described in this clause.

The 3GPP MTSIQOE (MTSI QoE metrics) MO defined in this clause may be used to configure the QoE metrics and reporting settings.

The metrics specified in the MO may be derived by the MTSI client. Version numbering is included for possible extension of the MO.

The Management Object Identifier may be: urn:oma:mo: ext-3gpp-mtsiqoe:1.0.

Protocol compatibility: The MO is compatible with OMA Device Management protocol specifications, version 1.2 and upwards, and is defined using the OMA DM Device Description Framework as described in the Enabler Release Definition OMA-ERELD_DM-V1_2.

Figure 9:
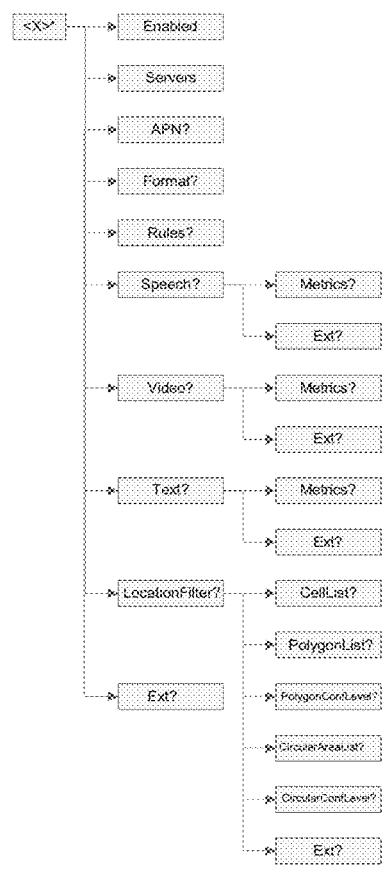
FIG. 9 illustrates a syntax of 3GPP-QoE-Metrics text for positioning in accordance with some embodiments.
Figure 16:
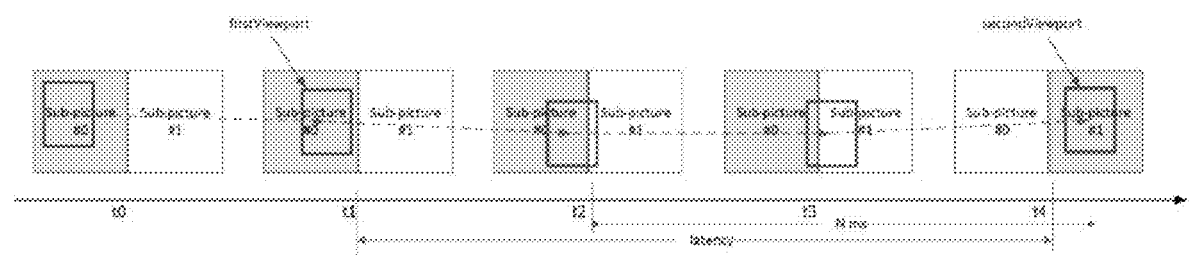
FIG. 16 illustrates a comparable quality viewport switching latency measurement in accordance with some embodiments.

The following nodes and leaf objects in FIG. 16.1 may be contained under the 3GPP_MTSIQOE node if an MTSI client supports the feature described in this clause (information of DDF for this MO is given in Annex I):

The syntax of the text contained in the Metrics leaf is similar to the "3GPP-QoE-Metrics." FIG. 9 illustrates a syntax of 3GPP-QoE-Metrics text for positioning in accordance with some embodiments. An attribute syntax specified in 3GPP TS 26.234 and 3GPP TS 26.346:

- QoE-Metrics = "3GPP-QoE-Metrics:" att-measure-spec *("," att-measure-spec)) CRLF
- att-measure-spec = Metrics ";" Sending-rate [";" Measure-Range]
  [";" Measure-Resolution] *([";" Parameter-Ext])
- Metrics = "metrics" "=" "{"Metrics-Name *("|" Metrics-Name) "}"
- Metrics-Name = 1*((0x21..0x2b) / (0x2d..0x3a) / (0x3c..0x7e) ;VCHAR except ";", ",", "{" or "}"
- Sending-Rate = "rate" "=" 1*DIGIT / "End"
- Measure-Resolution = "resolution" "=" 1*DIGIT ; in seconds
- Measure-Range = "range" ":" Ranges-Specifier
- Parameter-Ext = (1*DIGIT ["." 1*DIGIT]) / (1*((0x21..0x2b) / (0x2d..0x3a) / (0x3c..0x7a) / 0x7c / 0x7e))
- Ranges-Specifier = as defined in RFC 2326.

This attribute is used to indicate which QoE metrics are supported, the reporting interval, the measurement interval and reporting range.

The "Metrics" field contains the list of names that describes the metrics/measurements that are to be reported in a MTSI call, provided that the MTSI client supports these measurements and the reporting rule conditions are met (see clause 16.3.3). The names that are not included in the "Metrics" field may not be reported during the session.

The "Sending-Rate" may be set, and it expresses the maximum time period in seconds between two successive QoE reports. If the "Sending-Rate" value is 0, then the client may decide the sending time of the reports depending on the events occurred in the client. Values≥1 indicate a precise reporting interval. The shortest interval is one second and the longest interval is undefined. The reporting interval can be different for different media, but it is recommended to maintain a degree of synchronization in order to avoid extra traffic in the uplink direction. The value "End" indicates that only one report is sent at the end of the session.

The optional "Measure-Resolution" field, if used, may define a time over which each metrics value is calculated. The "Measure-Resolution" field splits the session duration into a number of equally sized periods where each period is of the length specified by the "Measure-Resolution" field. The "Measure-Resolution" field is thus defining the time before the calculation of a QoE parameter starts over. If the "Measure-Resolution" field is not present, the metrics resolution may cover the period specified by the "Measure-Range" field. If the "Measure-Range" field is not present the metrics resolution may be the whole session duration.

The optional "Measure-Range" field, if used, may define the time range in the stream for which the QoE metrics will be reported. There may be only one range per measurement specification. The range format may be any of the formats allowed by the media. If the "Measure-Range" field is not present, the metrics range may be the whole call duration.

This clause defines the syntax and semantics of a set of rules which are used to reduce the amount of reporting to the QoE metrics report server. The syntax of the metrics reporting rules is defined below:

- QoE-Rule = "3GPP-QoE-Rule" ":" rule-spec *("," rule-spec)
- rule-spec = rule-name [";" parameters]
- rule-name = "OnlyCallerReports" / "LimitSessionInterval" / "SamplePercentage"
- parameters = parameter *(";" parameter)
- parameter = Param-Name ["=" Param-Value ]
- Param-Name = 1*((0x21..0x2b) / (0x2d..0x3a) / (0x3c..0x7a) / 0x7e) ;VCHAR except ";", ",", "{" or "}"
- Param-Value = (1*DIGIT ["." 1*DIGIT]) / (1*((0x2..0x2b) / (0x2d..0x3a) / (0x3c..0x7a) / 0x7c / 0x7e))

The semantics of the rules and the syntax of its parameters is defined below:

The OnlyCallerReports rule is used to determine the metrics reporting sources. When this rule is present, only the initiator of the call, i.e., caller, will report metrics to the QoE report server. When absent all parties report metrics.

The SamplePercentage rule can be used to set a percentage sample of calls which should report reception. This can be useful for statistical data analysis of large populations while increasing scalability due to reduced total uplink signalling. The sample_percentage parameter takes on a value between 0 and 100, including the use of decimals. It is recommended that no more than 3 digits follow a decimal point (e.g. 67.323 is sufficient precision).

When the SamplePercentage rule is not present or its sample_percentage parameter value is 100 each MTSI client may send metric report(s). If the sample_percentage value is less than 100, the UE generates a random number which is uniformly distributed in the range of 0 to 100. The UE sends the reception report when the generated random number is of a lower value than the sample_percentage value.

The LimitSessionInterval rule is used to limit the time interval between consecutive calls that report metrics. The min_interval parameter for this rule indicates the minimum time distance between the start of two calls that are allowed to report metrics. When this rule is absent there is no limitation on the minimum time interval.

In case multiple rules are defined in the Management Object, the MTSI client should only report metrics when all individual rules evaluate to true (i.e. the rules are logically ANDed). In case no rules are present the MTSI client should always report metrics (see also clause 16.4 for metrics reporting procedures).

An example for a QoE metric reporting rule is shown below:
3GPR-QoE-Rule:OnlyCallerReports,SamplePercentage; sample_percentage=10.0,
    LimitSessionInterval;min_interval=300,
This example rule defines that only the caller may report, and only for 10% of the sessions, with the minimum time interval between the start times of two consecutive calls that report metrics to be 5 minutes.

When a session is started, the MTSI client must determine whether QoE reporting is to be used for the session. If the parameter "Enabled" is set to false, no QoE reporting may be done. If the "Enabled" parameter is set to true the optional "Rules" parameters are checked (sub-clause 16.3.3) to define if QoE reporting may be done.

Once the desire for QoE reporting has been established, the client may continuously compute all specified metrics for each measurement interval period, according to the "Measure-Resolution" parameter (sub-clause 16.3.2). In order to bound the resources used by metrics reporting, the minimum values for the Measure-Resolution and Sending-Rate are specified to be 5 seconds and 30 seconds respectively. The computed metrics are represented in a vector format, adding an additional metric value to each metric vector after each new measurement interval period.

Note that the calculated metrics may only cover one measurement interval. For instance, if the corruption duration extends longer than to the end of the current measurement interval, only the portion which fits into the current measurement interval may be reported. The remaining portion of the corruption duration may be reported as belonging to the next measurement interval.

The end of the session will normally not correspond to the end of a measurement interval period, so the metrics for the last measurement interval period will typically be calculated over a time shorter than the configured measurement interval. Note, however, that these last metrics may still be added to the metrics vectors and reported to the server.

It is possible for the server to use the start and stop timestamps, together with the knowledge of the configured measurement interval, to derive the actual length of the last measurement interval period, but any specific action or interpretation of these last shorter measurements is out of scope of this specification.

The MTSI client may send QoE report messages to the server in accordance with the specified reporting interval "Sending-Rate" (sub-clause 16.3.2). All stored metrics data may then be sent to the server, and then deleted from the metrics storage.

Note that if the reporting interval is not an integer multiple of the measurement interval, only the measurement interval periods which have been fully passed may be included in the report. The ongoing not-passed measurement interval period may be included in the next report. The only exception is at the end of the session, where also the last ongoing measurement interval period may be directly calculated and included in the report.

If QoE configuration has been done via the OMA MO, the client may send QoE reports using the HTTP (RFC 2616) POST request carrying XML formatted metadata. If the optional "APN" parameter is defined in the OMA managed object, that APN may be used for establishing the PDP context or EPS bearer on which the QoE metric reports will be transmitted. The MTSI client randomly selects one of the URIs from the MO "Server" parameter, with uniform distribution.

If QoE configuration has been done via the QMC functionality (see clause 16.5), the client may also send the QoE reports as described in clause 16.5.

Each QoE report is formatted in XML according the following XML schema (sub-clause 16.4.1). An informative example of a single reception report XML object is also given (sub-clause 16.4.2). The reports should be compressed using GZIP only if the MO parameter "Format" specifies this.

Each QoE Metrics element has a set of attributes and any number of media level QoE Metrics elements. All attributes are defined in sub-clause 16.4.1 and correspond to the QoE metrics listed in sub-clause 16.2. Individual metrics can be selected as described in sub-clause 16.3.2.

Except for the media level QoE metrics, the following parameters may be reported for each report:
  The callId attribute identifies the call identity of the SIP session.
  The clientID attribute is unique identifier for the receiver, e.g. an MSISDN of the UE as defined.
  The startTime and stopTime attributes identifies the client NTP time when the measurements included in the report were started and stopped. The time is based on the local real-time clock in the client, and might not be consistent with the true NTP time. However, assuming that the reporting is done without any extra delay the server can use the stopTime attribute to correct the timestamps if desired.
  The mediaId attribute may be reported for each media level QoE report, and identifies the port number for the media.
  If the attribute qoeReferenceId was defined in the QMC configuration (see clause 16.5.2), the value may be copied into each QoE report, to facilitate network-side correlation. If this attribute was defined, the attribute recordingSessionId may also be returned for each QoE report. The recordingSessionId is a two-byte octet defined by the client. It may remain the same for all QoE reports belonging to the same session, and it should be different for QoE reports belonging to different sessions.

As an alternative to configuration via OMA-DM, the QoE configuration can optionally be specified by the QoE Measurement Collection (QMC) functionality. In this case the QoE configuration is received via specific RRC messages over the control plane, and the QoE reporting is also sent back via RRC messages over the control plane.

If QMC is supported, the UE may support the following QMC functionalities:

QoE Configuration: The QoE configuration will be delivered via RRC to the UE as a container according to "Application Layer Measurement Configuration" for UMTS, and "measConfigApplicationLayer for LTE. The container is an octet string with a maximum length of 1000 bytes, with gzip-encoded data stored in network byte order. When the container is uncompressed it is expected to conform to XML-formatted QoE configuration data according to clause 16.5.2 in the current specification. This uncompressed QoE Configuration may be delivered to the MTSI client. The interface towards the RRC signalling is handled by the AT command +CAPPLEVMC.

QoE Metrics: QoE Metrics from the MTSI client may be XML-formatted according to clause 16.4 in the current specification. The XML data may be compressed with gzip and stored in network byte order into an octet string container with a maximum length of 8000 bytes. The container may be delivered via RRC to the RNC according to "Application Layer Measurement Reportinfor UMTS, and to the eNB according to "measReportApplicationLayer" for LTE. The behaviour if the compressed data is larger than 8000 bytes is unspecified in this version of the specification. The interface towards the RRC signalling is handled by the AT command +CAPPLEVMR.

The UE may also set the QMC capability "QoE Measurement Collection for MTSI services" to TRUE for UMTS, and include the QMC capability "qoe-mtsi-MeasReport" for LTE.

The QoE configuration AT command +CAPPLEVMC may also indicate with an Within-area indication if the UE is inside or outside a wanted geographic area. Such an indication may arrive with or without any QoE configuration container attached. If the MTSI client is informed that it is not inside the area, it may not start any new QoE measurements even if it has received a valid QoE configuration container, but may continue measuring for already started sessions.

When a new session is started, the QoE reporting AT command +CAPPLEVMR may be used to send a Recording Session Indication. Such an indication does not contain any QoE report, but indicates that QoE recording has started for a session.

The exact implementation is not specified here, but an example signalling diagram below shows the QMC functionality with a hypothetical "QMC Handler" entity.

Figure 10:
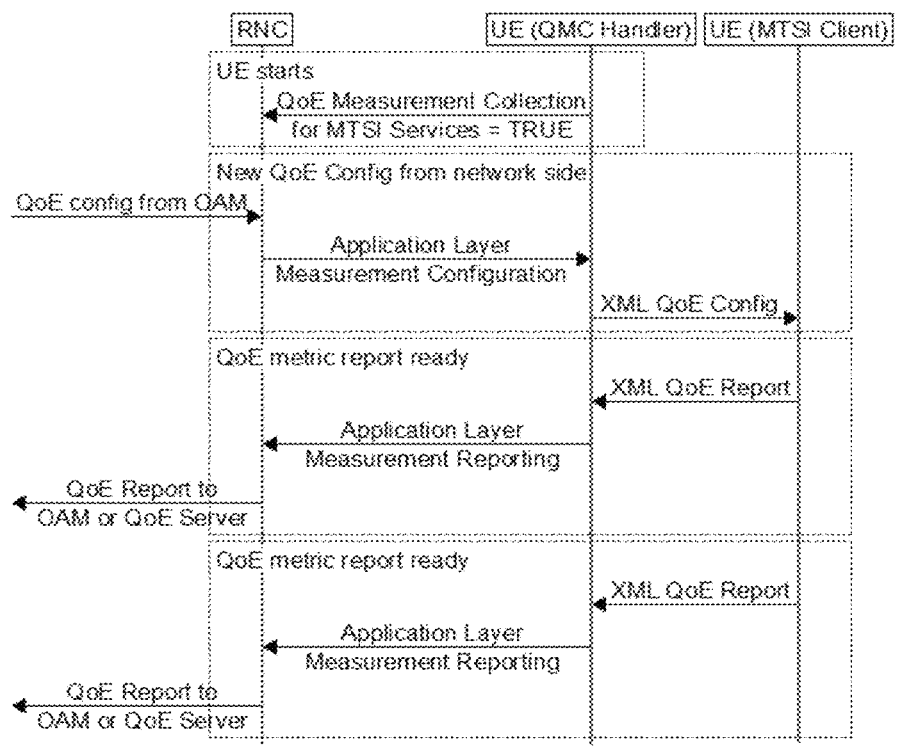
FIG. 10 illustrates a signalling diagram for Universal Mobile Telecommunications System (UMTS) in accordance with sonic embodiments.
Figure 11:
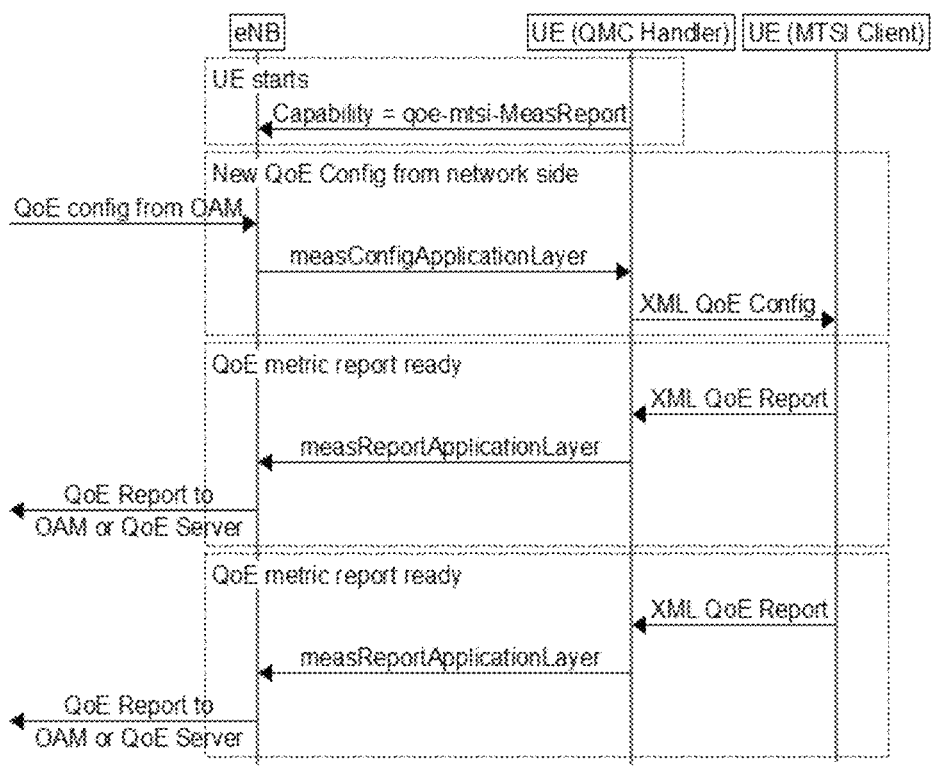
FIG. 11 illustrates a signalling diagram for LTE in accordance with some embodiments.

FIG. 10 illustrates a signalling diagram for UMTS in accordance with some embodiments. FIG. 11 illustrates a signalling diagram for LTE in accordance with some embodiments.

Note that the QMC Handler is only shown here as one possible implementation, other implementations are possible. The corresponding QMC functionality could be built into the MTSI client or into other UE entities. In this version of the specification the detailed implementation of the above functionalities is left to the UE vendor.

When QoE reporting is configured via the QMC functionality, the configuration basically contains the same information as in the QoE metrics reporting managed object (see clause 16.3.1), but encapsulated according to the XML scheme below. Note that the managed object leaves "Servers", "APN" and "Format" are not used for the QMC functionality, and thus not included.

Note that if geographical filtering is handled on the network side (i.e. QoE reporting is turned on/off by the network depending on the UE location), no LocationFilter should be specified in the QoE Configuration, as this would mean two consecutive filterings.

Also note that the optional attribute qoeReferenceId is a reference set by the network side, which is not directly used by the client. However, if this attribute is defined, it may be copied into each QoE report, to facilitate network-side correlation.

Contribution

VR metrics is a functionality where the client collects specific quality-related metrics during a session. These collected metrics can then be reported back to a network side node for further analysis.

Figure 12:
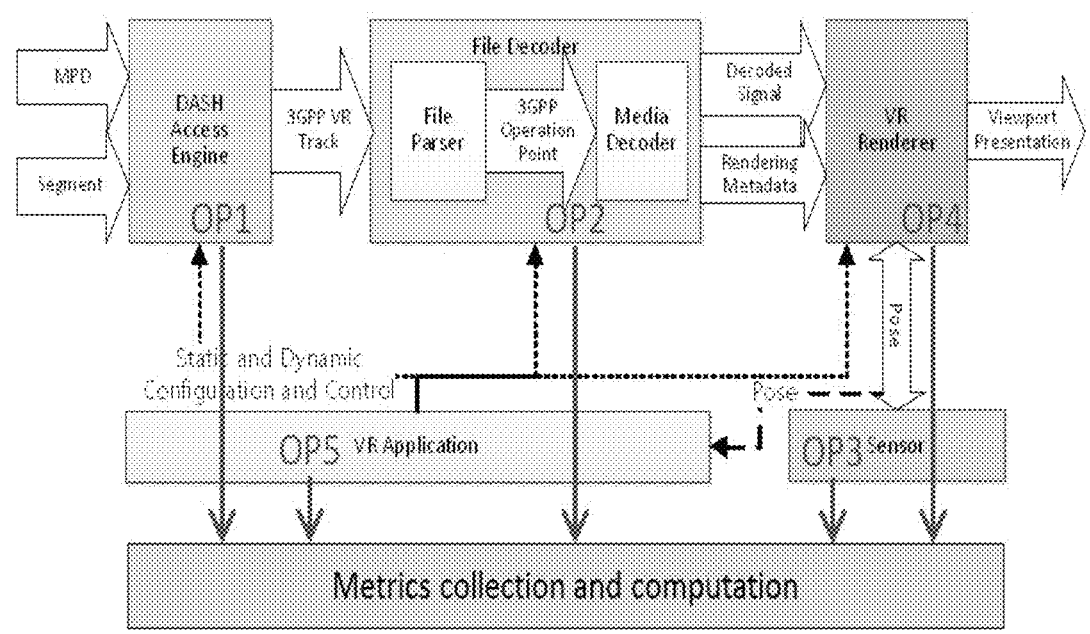
FIG. 12 illustrates a client reference architecture for VR metrics in accordance with some embodiments.

FIG. 12 illustrates a client reference architecture for VR metrics in accordance with some embodiments. The client reference architecture for VR metrics, shown in FIG. 12, is based on the client architecture in FIG. 4.3-1 of TS 26.114. It also contains a number of observation points where specific metric-related information can be made available to the Metrics Collection and Computation (MCC) function. The MCC can use and combine information from the different observation points to calculate more complex metrics.

Note that these observation points are only defined conceptually, and might not always directly interface to the MCC. For instance, an implementation might relay information from the actual observation points to the MCC via the VR application. It is also possible that the MCC is not separately implemented, but simply included as an integral part of the VR application.

Also note that in this version of this specification not all of the described observation points are used to produce VR metrics.

Observation Point 1

Based on one or more received RTP media streams, the UE parses, possibly decrypts and feeds the elementary stream to the HEVC decoder.

The interface from the RTP receiver towards MCC is referred to as observation point 1 (OP1) and is defined to monitor:
  The reception time for each received RTP packet as well as packet losses and interarrival times of the RTP packets.
  Relevant RTCP packet information including RTCP sender and receiver reports containing packet statistics, as well as related RTCP feedback messages for rate adaptation as well as for viewport information signaling Observation Point 2

The HEVC decoder receives the elementary bitstream and obtains the decoder output signal, referred to as the "texture", as well as the decoder metadata. The Decoder Metadata contains the Supplemental Information Enhancement (SEI) messages, i.e., information carried in the omnidirectional video specific SEI messages, to be used in the rendering phase.

The interface from the HEVC decoder towards MCC is referred to as observation point 2 (OP2) and is defined to monitor:
- Media resolution
- Media codec
- Media frame rate
- Media projection, such as region wise packing, region wise quality ranking, content coverage
- Mono vs. stereo 360 video
- Media decoding time

Observation Point 3

The sensor extracts the current pose according to the user's head and/or eye movement and provides it to the renderer for viewport generation. The current pose may also be used by the VR application to control the RTP receiver to signal for instance viewport information to the RTP sender using RTCP feedback messages.

The interface from the sensor towards MCC is referred to as observation point 3 (OP3) and is defined to monitor:
- Head pose
- Gaze direction
- Pose timestamp
- Depth

Observation Point 4

The output signal, i.e., the decoded picture or "texture", is then rendered using the Decoder Metadata information contained in relevant SEI messages contained in the video elementary streams. The Decoder Metadata is used when performing rendering operations such as region-wise unpacking, projection de-mapping and rotation toward creating spherical content for each eye. The VR Renderer uses the decoded signals and rendering metadata, together with the pose and the knowledge of the horizontal/vertical field of view, to determine a viewport and render the appropriate part of the video and audio signals.

The interface from the media presentation towards MCC is referred to as observation point 4 (OP4) and is defined to monitor:
- The media type
- The media sample presentation timestamp
- Wall clock counter
- Actual presentation viewport
- Actual presentation time
- Actual playout frame rate
- Audio-to-video synchronization
- Video-to-motion latency
- Audio-to-motion latency

Observation Point 5

The VR application manages the complete device, and controls the RTP receiver, the HEVC decoder and the rendering based on media control information, the dynamic user pose, and the display and device capabilities.

The interface from the VR application towards MCC is referred to as observation point 5 (OP5) and is defined to monitor:
- Display resolution
- Max display refresh rate
- Field of view, horizontal and vertical
- Eye to screen distance
- Lens separation distance
- OS support, e.g. OS type, OS version

Metrics Definitions

Comparable Quality Viewport Switching Latency

The comparable quality viewport switching latency metric reports the latency and the quality-related factors when viewport movement causes quality degradations, such as when low-quality background content is briefly shown before the normal higher-quality is restored. Note that this metric is only relevant in case of viewport dependent processing, i.e., when Vital Product Data (VPD) capability is negotiated.

The viewport quality is represented by two factors; the quality ranking (QR) value, and the pixel resolution of one or more regions within the viewport. The resolution is defined by the orig_width and orig_height values in ISO/IEC 23090-2 in SRQR (Spherical-Region Quality Ranking) or 2DQR (2-Dimensional Quality Ranking). The resolution corresponds to the monoscopic projected picture from which the packed region covering the viewport is extracted.

In order to determine whether two viewports have a comparable quality, if more than one quality ranking region is visible inside the viewport, the aggregated viewport quality factors are calculated as the area-weighted average for QR and the area-weighted (effective) pixel resolution, respectively.

For instance, if 60% of the viewport is from a region with QR=1, Res=3840×2160, and 40% is from a region with QR=2, Res=960×540, then the average QR is 0.6×1+0.4×2, and the effective pixel resolution is 0.6×3840×2160+0.4× 960×540 (also see below for more examples).

If the viewport is moved so that the current viewport includes at least one new quality ranking region (i.e. a quality ranking region not included in the previous viewport), a switch event is started. The list of quality factors related to the last evaluated viewport quality before the switch are assigned to the firstViewport log entry. The start time of the switch is also set to the time of the last evaluated viewport before the switch.

The end time for the switch is defined as when both the weighted average QR and the effective resolution for the viewport reach values comparable to the ones before the switch. A value is comparable if it is not more than QRT % (QR threshold) or ERT % (effective resolution threshold) worse than the corresponding values before the switch. If comparable values are not achieved within N milliseconds, a timeout occurs (for instance if an adaptation to a lower bitrate occurs, and the viewport never reaches comparable quality).

Note that smaller QR values and larger resolution values are better. For instance, QRT=5% would use a weighted average QR value equal or smaller than 105% of the weighted average QR before the switch, but ERT=5% would use an effective resolution value equal or larger than 95% of the effective resolution before the switch.

The list of quality factors related to the viewport which fulfills both thresholds are assigned to the second log entry, and the latency (end time minus start time) is assigned to the latency log entry. In case of a timeout, this is indicated under the cause log entry.

During the duration of the switch the worst evaluated viewport is also stored, and assigned to the worstViewport log entry. The worst viewport is defined as the viewport with the worst relative weighted average QR or relative effective resolution, as compared to the values before the switch.

If a new viewport switching event occurs (e.g. yet another new region becomes visible) before an ongoing switch event has ended, only the N milliseconds timeout is reset. The ongoing measurement process continues to evaluate the viewport quality until a comparable viewport quality value is achieved (or a timeout occurs).

The observation points used to calculate the metrics are:
OP2 HEW Decoder: SRQR/2DQR information
OP3 Sensor: Gaze information
OP4 VR Renderer: Start of switch event detection (alternatively, region coverage information from SRQR/2DQR can be used when strict rendering pixel-exactness is not)
OP5 VR Application: Field-of-view information of the device The accuracy of the measured latency depends on how the client implements the view-port switching monitoring. As this might differ between clients, the client may report the estimated accuracy.

The thresholds QRT, ERT, and the timeout N, can be specified during metrics configuration (see clause 9.4) as attributes within parenthesis, e.g. "CompQualLatency (QRT=3.5,ERT=6.8,N=900)". If a threshold or the timeout is not specified, the client uses appropriate default values.

The data type ViewportDataType is defined in Table 9.3.2-1 below, and identifies the direction and coverage of the viewport.

TABLE 9.3.2-1

ViewportDataType

| Key | Type | Description |
|---|---|---|
| ViewportDataType | Object | |
| centre_azimuth | Integer | Specifies the azimuth of the centre of the viewport in units of $2^{-16}$ degrees. The value may be in the range of $-180 * 2^{16}$ to $180 * 2^{16} - 1$, inclusive. |
| centre_elevation | Integer | Specifies the elevation of the centre of the viewport in units of $2^{-16}$ degrees. The value may be in the range of $-90 * 2^{16}$ to $90 * 2^{16}$, inclusive. |
| centre_tilt | Integer | Specifies the tilt angle of the viewport in units of $2^{-16}$ degrees. The value may be in the range of $-180 * 2^{16}$ to $180 * 2^{16} - 1$, inclusive. |
| azimuth_range | Integer | Specifies the azimuth range of the viewport through the centre point of the viewport, in units of $2^{-16}$ degrees. |
| elevation_range | Integer | Specifies the elevation range of the viewport through the centre point of the viewport, in units of $2^{-16}$ degrees. |

The data type Viewport-Item is defined as shown in Table 2. Viewport-Item is an Object which identifies a viewport and quality-related factors for the region(s) covered by the viewport.

TABLE 9.3.2-2

ViewportItem

| Key | Type | Description |
|---|---|---|
| ViewportItem | Object | |
| Position | ViewportDataType | Identifies the viewport |
| QualityLevels | List | List of different quality levels regions within the viewport |

TABLE 9.3.2-2-continued

ViewportItem

| Key | Type | Description |
|---|---|---|
| Coverage | Float | Percentage of the viewport area covered by this region |
| QR | Integer | Quality ranking (QR) value of this region |
| Resolution | Object | Resolution for this region |
| Width | Integer | Horizontal resolution for this region |
| Height | Integer | Vertical resolution for this region |

The comparable quality viewport switching latency metric is specified in Table 9.3.2-1 below.

TABLE 9.3.2-1

Comparable quality viewport switching latency metric

| Key | Type | Description |
|---|---|---|
| CompQualLatency | List | List of comparable quality viewport switching latencies |
| Entry | Object | |
| firstViewport | ViewportItem | Specifies information about the first viewport |
| secondViewport | ViewportItem | Specifies information about the second viewport |
| worstViewport | ViewportItem | Specifies information about the worst viewport seen during the switch duration |
| Time | Real-Time | Wall-clock time when the switch started. |
| Mtime | Media-Time | Media presentation time when the switch started. |
| Latency | Integer | Specifies the switching delay in milliseconds. |
| Accuracy | Integer | Specifies the estimated accuracy of the latency metric in milliseconds |
| Cause | List | Specifies a list of possible causes for the latency. |
| Entry | Object | |
| Code | Enum | A possible cause for the latency. The value is equal to one of the following: 0: Segment duration 1: Buffer fullness 2: Availability of comparable quality segment 3: Timeout |

Rendered Viewports

The rendered viewports metric reports a list of viewports that have been rendered during the media presentation.

The client evaluates the current viewport gaze every X ins and potentially add the viewport to the rendered viewport list. To enable frequent viewport evaluations without increasing the report size too much, consecutive viewports which are close to each other may be grouped into clusters, where only the average cluster viewport data is reported. Also, clusters which have too short durations may be excluded from the report.

The viewport clustering is controlled by an angular distance threshold D. If the center (i.e. the azimuth and the elevation) of the current viewport is closer than the distance D to the current cluster center (i.e. the average cluster azimuth and elevation), the viewport is added to the cluster.

Note that the distance is only compared towards the current (i.e. last) cluster, not to any earlier clusters which might have been created.

If the distance to the cluster center is instead equal to or larger than D, a new cluster is started based on the current viewport, and the average old cluster data and the start time and duration for the old cluster is added to the viewport list.

Before reporting a viewport list, a filtering based on viewport duration may be done. Each entry in the viewport list is first assigned an "aggregated duration" equal to the duration of that entry. Then, for each entry E, the other entries in the viewport list are checked. The duration for a checked entry is added to the aggregated duration for entry E, if the checked entry is both less than T ms away from E, and closer than the angular distance D from E.

After all viewport entries have been evaluated and have received a final aggregated duration, all viewport entries with an aggregated duration of less than T are deleted from the viewport list (and thus not reported). Note that the aggregated duration is only used for filtering purposes, and not itself included in the viewport list reports.

Some examples of metric calculation are shown in Annex D.2.

The observation points used to calculate the metrics are: OP3 Sensor: Gaze information; OP5 VR Application: Field-of-view information of the device.

The viewport sample interval X (in ms), the distance threshold D (in degrees), and the duration threshold T (in ms) can be specified during metrics configuration as attributes within parenthesis, e.g. "RenderedViewports(X=50, D=15,T=1500)". Note that if no clustering or duration filtering is wanted, the D and thresholds can be set to 0 (e.g. specifying "RenderedViewports(X=1000,D=0,T=0)" will just log the viewport every 1000 ms). If no sample interval or thresholds values are specified the client may use appropriate default values.

The rendered viewports metric is specified in Table 9.3.3-1.

TABLE 9.3.3-2

| Rendered viewports metric | | |
|---|---|---|
| Key | Type | Description |
| RenderedViewports Entry | List Object | List of rendered viewports |
| startTime | Media-Time | Specifies the media presentation time of the first played out media sample when the viewport cluster indicated in the current entry is rendered starting from this media sample. |
| duration | Integer | The time duration, in units of milliseconds, of the continuously presented media samples when the viewport cluster indicated in the current entry is rendered starting from the media sample indicated by startTime. "Continuously presented"means that the media clock continued to advance at the play out speed throughout the interval. |

TABLE 9.3.3-2-continued

| Rendered viewports metric | | |
|---|---|---|
| Key | Type | Description |
| viewport | Viewport-DataType | Indicates the average region of the omnidirectional media corresponding to the viewport cluster being rendered starting from the media sample time indicated by startTime. |

VR Device Information

This metric contains information about the device, and is logged at the start of each session and whenever changed (for instance if the rendered field-of-view for the device is adjusted). If an individual metric cannot be logged, its value may be set to 0 (zero) or to the empty string.

The observation point used to report the metrics is: OP5 VR Application: Device information

TABLE 9.3.4-1

| Device information | | |
|---|---|---|
| Key | Type | Description |
| VrDeviceInformation Entry | List Object | A list of device information objects. A single object containing new device information. |
| Start | Real-Time | Wall-clock time when the device information was logged. |
| Mstart | Media-Time | The presentation time at which the device information was logged. |
| deviceIdentifier | String | The brand, model and version of the device. |
| horizontalResolution | Integer | The horizontal display resolution, per eye, in pixels. |
| verticalResolution | Integer | The vertical display resolution, per eye, in pixels. |
| horizontalFoV | Integer | Maximum horizontal field-of-view, per eye, in degrees. |
| verticalFoV | Integer | Maximum vertical field-of-view, per eye, in degrees. |
| renderedHorizontalFoV | Integer | Current rendered horizontal field-of-view, per eye, in degrees. |
| renderedVerticalFoV | Integer | Current rendered vertical field-of-view, per eye, in degrees. |
| refreshRate | Integer | Display refresh rate, in Hz |

Metrics Configuration and Reporting

Configuration

Metrics configuration is done according to MTSI in TS 26.114, but can also include any metrics above.

Reporting

Metrics reporting is done according to MTSI, with the type QoeReportType extended to handle the additional VR-specific metrics according the XML schema in clause 9.4.3. In this version of the specification the element vrMetricSchemaVersion is set to 1.

| Reporting Format |
|---|
| <?xml version="1.0"?><br><xs:schema xmlns:xs="http://www.w3.org/2001/XMLSchema"<br>  targetNamespace="urn:3gpp:metadata:2020:VR:metrics"<br>  xmlns:hsd="urn:3gpp:metadata:2011:HSD:receptionreport" |

-continued

| Reporting Format |
|---|
| xmlns="urn:3gpp:metadata:2020:VR:metrics" elementFormDefault="qualified"> <br> <xs:complexType name="Vr-QoeReportType"> <br>   <xs:complexContent> <br>     <xs:extension base="QoeReportType" <br>       <xs:sequence> <br>         <xs:element name="Metric" type-"VrMetricType" <br>           minOccurs="0" maxOccurs="unbounded"/> <br>         <xs:element name="vrMetricSchemaVersion" type="unsignedInt"/> <br>         <xs:any namespace="##other" processContents="lax"" <br>           minOccurs="0" maxOccurs="unbounded"/> <br>       </xs:sequence> <br>     </xs:extension> <br>   </xs:complexContent> <br>   <xs:anyAttribute processContents="skip"/> <br> </xs:complexType> <br> <xs:complexType name="VrMetricType"> <br>   <xs:choice maxOccurs="unbounded" <br>     <xs:element name="compQualLatency" type="CompQualLatencyType" <br>       maxOccurs="unbounded"/> <br>     <xs:element name="renderedViewports" type="RenderedViewpertsType" <br>       maxOccurs="unbounded"/> <br>     <xs:element name="vrDeviceinformation" type="VrDeviceInformatinnType" <br>       maxOccurs="unbounded"/> <br>     <xs:any namespace=" ##other" processContents="lax" <br>       minOccurs="0" maxOccurs="unbounded"/> <br>   </xs:choice> <br>   <xs:anyAttribute processContents="skip"/> <br> </xs:complexType> <br> <xs:complexType name="CompQualLatencyType" <br>   <xs:sequence> <br>     <xs:element name="firstViewport" type="ViewportItem"/> <br>     <xs:element name="secondViewport" type="ViewportItem"/> <br>     <xs:element name="worstViewport" type="ViewportItem"/> <br>     <xs:element name="time" type="xs:dateTime"/> <br>     <xs:element name="mtime" type="xs:duration"/> <br>     <xs:element name="latency" type="xs:unsignedInt"/> <br>     <xs:element name="accuracy" type="xs:unsignedTnt"/> <br>     <xs:element name="cause" type="unsignedInt" minoccurs="0" maxoccurs="unbounded"/> <br>     <xs:any namespace="##other" processContents="lax" <br>       minOccurs="0" maxOccurs="unbounded"/> <br>   </xs:sequence> <br>   <xs:anyAttribute processContents="skip"/> <br> </xs:cmplexType> <br> <xs:complexType name="RenderedViewportsType" <br>   <xs:sequence> <br>     <xs:element name="startTime" type="xs:duration"/> <br>     <xs:element name="duration" type="xs:unsignedInt"/> <br>     <xs:element name= viewport:" type="ViewportDataType"/> <br>     <xs:any namespace="##other" processContents="lax" <br>       minOccurs="0" maxOccurs="unbounded"/> <br>   </xs:sequence> <br>   <xs:anyAttribute proce sContents="skip"/> <br> </xs:cmplexType> <br> <xs:complexType name="VrDeviceInformationType" > <br>   <xs:sequence> <br>     <xs:element name="start" type="xs:dateTime"./> <br>     <xs:element name="mstart" type="xs:duration"/> <br>     <xs:element name="deviceIdentifier" type=cs:string/> <br>     <xs:element name="horizontalResolution" type=cs:unsignedInt/> <br>     <xs:element name="verticalResolution" type=cs:unsignedInt/> <br>     <xs:element name="horizontalFoV" type=cs:unsignedInt/> <br>     <xs:element name="verticalFoV" type=cs:unsignedInt/> <br>     <xs:element name="renderedHorizontalFoV" type=cs:unsignedInt/> <br>     <xs:element name="renderedVerticalFoV" type=cs:unsignedInt/> <br>     <xs:element name="refreshRate" type=cs:unsignedInt/> <br>     <xs:any namespace="##other" processContents="lax" <br>       minOccurs="0" maxOccurs="unbounded"/> <br>   </xs:sequence> <br>   <xs:anyAttribute processContents="skip"/> <br> </xs:cmplexType> <br> <xs:complexType name="ViewportItem" <br>   <xs:sequence> <br>     <xs:element name="position" type="ViewportDataType"/> <br>     <xs:element name="qualityLevel" type"QualityLevelEntry" |

| Reporting Format |
|---|
| ```
maxOccurs="unbounded"/>
        <xs:any namespace="##other" processContents="lax"
            minOccurs="0" maxOccurs="unbounded"/>
      </xs:sequence>
      <xs:anyAttribute processContents="skip"/>
  </xs:complexType>
  <xs:complexType name="ViewportDataType"
      <xs:sequence>
         <xs:element name="centerAzimuth" type="xs:unsignedInt"/>
         <xs:element name="center Elevation" type="xs:unsignedInt"/>
         <xs:element name="centreTilt" type="xs:unsignedInt"/>
         <xs:element name="azimuthRange" type="xs:unsignedInt"/>
         <xs:element name="elevationRange" type="xs:unsignedInt"/>
         <xs:any namespace="##other" processContents="lax"
             minOccurs="0" maxOccurs="unbounded"/>
      </xs:sequence>
      <xs:anyAttribute processContents="skip"/>
  </xs:cmplexType>
  <xs:complexType name="QualityLevelEntry">
      <xs:sequence>
         <xs:element name="coverage" type="xs:double"/>
         <xs:element name="qr" type"xs:unsigned-Int"/>
         <xs:element name"width" type="xs:unsignedInt"/>
         <xs:element name="height" type="xs:unsignedInt"/>
         <xs:any namespace="##other" processContents="lax"
             minOccurs="0" maxOccurs="unbounded"/>
      </xs:sequence>
      <xs:anyAttribute processContents="skip"/>
  </xs:complexType>
</xs:schema>
``` |

VR Metrics Calculation Examples

Comparable Quality Viewport Switching Latency

This sub-clause illustrates how the weighted average QR value and the effective resolution can be calculated.

The quality level of each region is determined with its respective quality ranking (QR) value. A viewport can be covered with multiple regions. A quality level value for the viewport can be derived as weighted average of the QR values of the regions covering the viewport. The weight of each region is defined as the percentage of the viewport area covered by the corresponding region. The viewport quality level can be calculated by the following equation.

$$QualityLevel(\text{viewport}) = \sum_{i=1}^{N} (QR[i] \times Coverage[i]/100)$$

Figure 13:
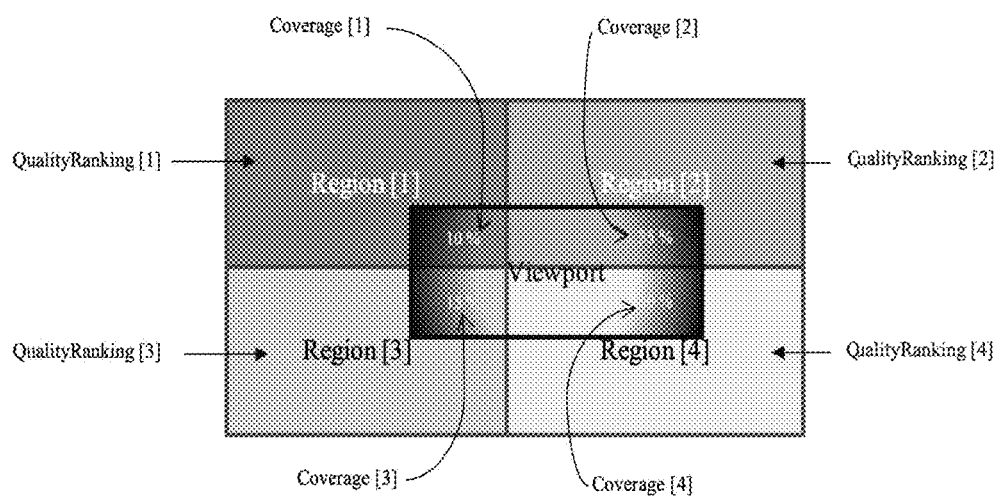
FIG. 13 illustrates a viewport covered by four quality ranking two dimensional (2D) regions in accordance with some embodiments.

N: Number of regions covering the viewport
QR[i]: QR value of i-th quality ranking region
Coverage[i]: The viewport coverage value (in percent) of i-th quality ranking region FIG. 13 illustrates a viewport covered by four quality ranking two dimensional (2D) regions in accordance with some embodiments. The quality of the viewport is equal to the weighted sum of the quality ranking value and the coverage percentage value of each quality ranking region.

The resolution of each region is determined by its respective width and height values in pixel which are available in the quality ranking box under the name orig_width and orig_height. Note that these values are already normalized to represent the full-sphere resolution you would get if the resolution of this region would be used for the full sphere.

The effective resolution (i.e. the total number of original pixels) for the content visible in the viewport can be derived as the weighted average of the resolution of each region covering the viewport. The weight of each region is defined by the percentage of the viewport area covered by the corresponding region. The effective viewport resolution can be calculated by the following equation.

$$EffectiveResolution(\text{viewport}) = \sum_{i=1}^{N} (\text{width}[i] \times \text{height}[i] \times Coverage[i]/100)$$

Figure 14:
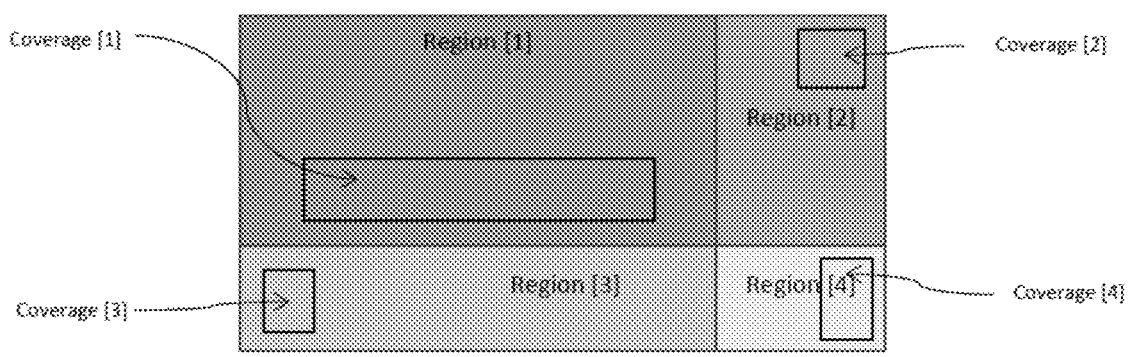
FIG. 14 illustrates a source packed image with four quality ranking 2D regions with different resolutions in accordance with some embodiments.
Figure 15:
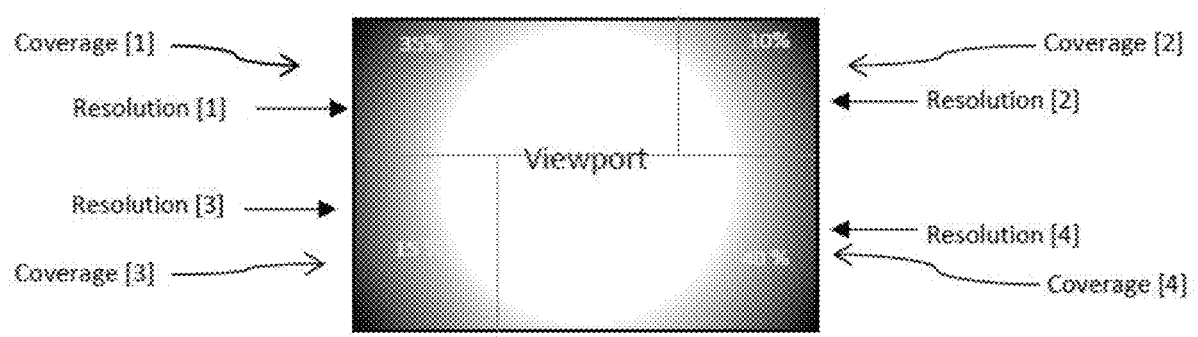
FIG. 15 illustrates a viewport covered by four different quality ranking 2D regions in accordance with some embodiments.

N: Number of regions covering the viewport
width[i]: The width component of the original source pixel resolution for the i-th quality ranking region
height[i]: The height component of the original source pixel resolution resolution for the i-th quality ranking region
Coverage[i]: The viewport coverage value (in percent) of i-th quality ranking region FIG. 14 illustrates a source packed image with four quality ranking 2D regions with different resolutions in accordance with some embodiments. FIG. 15 illustrates a viewport covered by four different quality ranking 2D regions in accordance with some embodiments. The effective viewport resolution is equal to the weighted sum of the resolution for each quality-ranking 2D region and its corresponding viewport coverage percentage value. FIG. 16 illustrates a comparable quality viewport switching latency measurement in accordance with some embodiments.

The viewport quality is evaluated at time t0, and then again at time t1. The media playback module renders the high-resolution sub-picture #1 at time t1. The user viewing orientation is gradually changing from sub-pic #1 to sub-pic #2 as the time progresses.

At time t2, the media playback module starts to render the buffered low-quality representation of sub-pic #2 as the viewport moves into sub-picture #2. At time t2, the viewport quality drops in values as compared to the viewport quality at time t1, and a new sub-picture (sub-pic #2) is rendered. A viewport switching event is identified at time t2.

The viewport quality values evaluated at t1 identifies the first viewport. The viewport position and viewport quality level list are assigned to the attributed Position and QualityLevel of the firstViewportItem.

An effective viewport resolution and viewport QR quality value for the new viewport that is comparable to that of the firstViewportItem after viewport switching time is logged at time t4. The new viewport position identifies the Position of the secondViewportItem. The corresponding QualityLevel list for the second is assigned.

The associated viewport values stored for the worst viewport quality during the switch is assigned to the field Position of the worst The corresponding QualityLevel list for the worstViewportItem is also assigned.

The comparable-quality viewport switching latency is measured as the time interval between the logged times for firstViewportItem (t1 in this example) and secondViewportItem (t4 in this example).

Rendered Viewports

Figure 17:
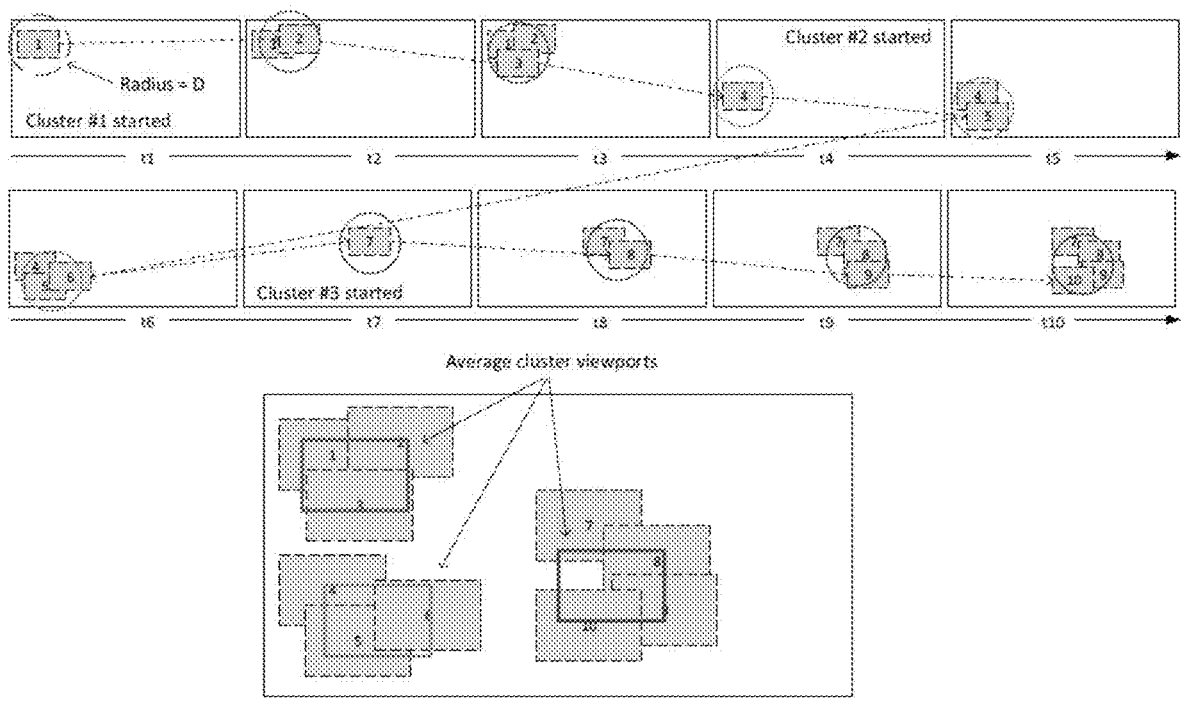
FIG. 17 illustrates a clustering example in accordance with some embodiments.

FIG. 17 illustrates a clustering example in accordance with some embodiments. The first three evaluated viewports are all with the distance D (indicated by the blue circle), and are thus assigned to the same cluster. Note that the cluster center moves a bit for each new viewport which is added to the cluster. Viewport #4 is too far away from the center of cluster #1, and thus starts a new cluster, which eventually gathers three viewport members. Then viewport #7 is too far away from the center of cluster #2, and again starts a new cluster.

For each cluster j, the final averaged viewport parameters can be derived as follows, assuming there are N viewports in the j:th cluster. Note that the center azimuth and tilt averaging is also to handle the special case around −180/180 degrees, as some values might be positive (e.g. 176 degrees), while others might be negative (e.g. −178 degrees). This special case is not shown in the equations below.

Note also that the azimuth and elevation range (i.e. the visible coverage of the viewport) might often be the same for every viewport, unless the user explicitly changes the field-of-view for the device. For consistency, and to catch any during-session field-of-view changes, these two parameters should still be averaged.

$$\text{average\_centre\_azimuth}[j] = \sum_{i=1}^{N} \text{centre\_azimuth}[i]/N$$

$$\text{average\_centre\_elevation}[j] = \sum_{i=1}^{N} \text{centre\_elevation}[i]/N$$

$$\text{average\_centre\_tilt}[j] = \sum_{i=1}^{N} \text{centre\_tile}[i]/N$$

-continued $$\text{average\_azimuth\_range}[j] = \sum_{i=1}^{N} \text{azimuth\_range}[i]/N$$

$$\text{average\_elevation\_range}[j] = \sum_{i=1}^{N} \text{elevation\_range}[i]/N$$

Figure 18:
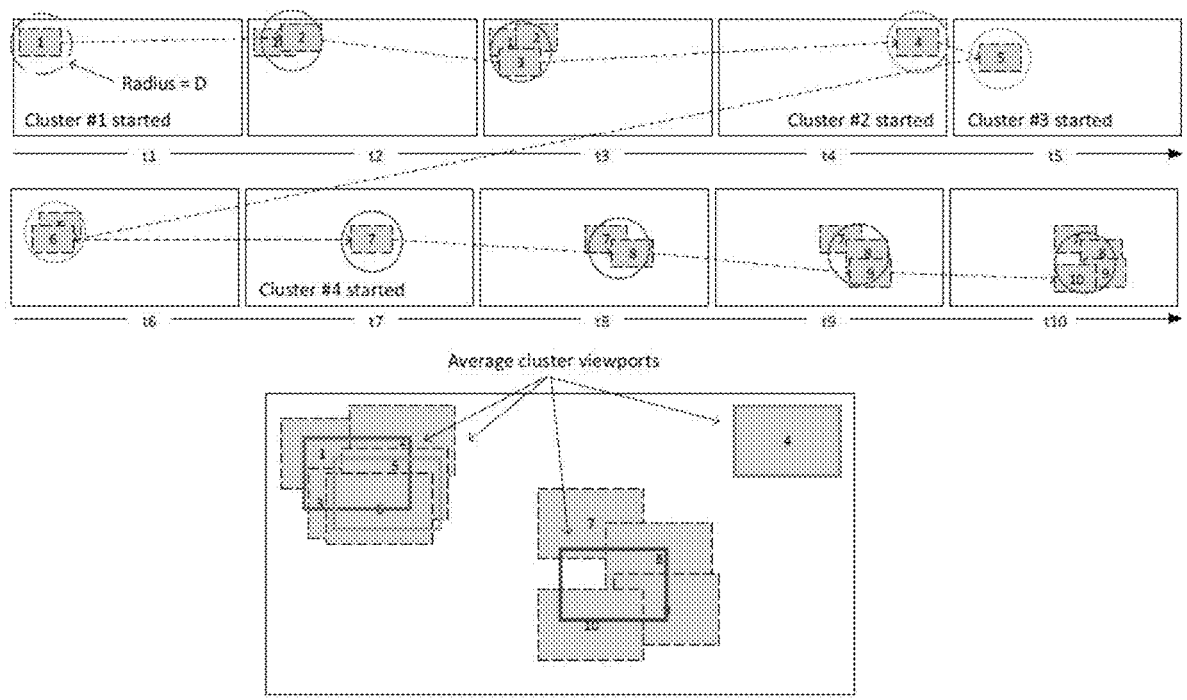
FIG. 18 illustrates a duration filtering example in accordance with some embodiments.

FIG. 18 illustrates a duration filtering example in accordance with some embodiments. The user starts by looking at the upper left part of the media (viewports #1 to #3), then make a very brief glance to the right (viewport #4), and then moves back to the upper-left again (viewports #5 and #6). Then the user moves his gaze to the lower-right part (viewports #7 to #10).

Assume here that the duration T is set to 4 times the value of the viewport sample rate X, i.e. a cluster is to have a duration corresponding to at least four viewports to be reported, Here four clusters are formed, but before filtering only cluster #4 would be reported. After filtering, clusters #1 and #3 are close enough both in time and distance to add to each other's aggregated duration, so each of them are assigned an aggregated duration of 5, and thus be reported. Cluster #2, the quick glance up to the right, has too short duration and will not be reported.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus for a teleconference, the apparatus comprising:
   processing circuitry configured to:
      collect virtual reality (VR) quality-related metrics during a VR session, the VR quality-related metrics including viewport switching latency, rendered viewports, and device i nformation; and
      provide control signals to a display based on the VR quality-related metrics as part of a Quality of Experience (QoE) framework within Real Time Protocol (RTP)-based 360° video delivery over Multimedia Telephony Service for Internet Protocol Multimedia Subsystem (MTSI); and
   a memory configured to store the VR quality-related metrics.

2. The apparatus of claim 1, further comprising:
   a RTP receiver configured to receive an RTP stream and produce an elementary stream; based thereon;
   High Efficiency Video Coding (HVEC) decoder configured to receive the elementary stream and produce a texture signal based thereon;
   a texture-to-sphere mapper configured to map the texture signal to a three dimensional (3D) video, the VR quality-related metrics collected from the RTP receiver, the HVEC decoder, and the texture-to-sphere mapper; and
   a renderer configured to render the 3D video to generate a viewport.

3. The apparatus of claim 2, wherein the RTP receiver is configured to provide at least some of the N/R quality-related metrics including:
   a reception time for each of a plurality of RTP packets, packet losses and interarrival times of the RTP packets, and
   RTP Control Protocol (RTCP) packet information including:
      an RTCP sender and receiver reports containing packet statistics, and
      RTCP feedback messages for rate adaptation and for viewport information signaling.

4. The apparatus of claim 2, wherein the HVEC decoder is configured to:
   obtain decoder metadata that contains Supplemental Information Enhancement (SEI) messages of information carried in omnidirectional video-specific SEI messages to render the 3D video, and
   provide at least some of the VR quality-related metrics including a media resolution, a media codec, a media frame rate, a media projection that includes region-wise packing, region-wise quality ranking, and content coverage, a selection between mono and stereo 360 degree video, and a media decoding time.

5. The apparatus of claim 2, further comprising:
   a sensor configured to extract a current pose of a user based on at least one of head or eye movement, the current pose provided to the renderer,
   wherein to extract the current pose, the sensor is configured to monitor a head pose, a gaze direction, a pose timestamp and a depth, and
   the RTP receiver is controlled by the current pose to signal viewport information to an RTP sender using RTCP feedback messages.

6. The apparatus of claim 2, wherein the renderer is configured to use decoder metadata information contained in Supplemental Information Enhancement (SEI) messages contained in the elementary stream to render video and audio signals of the 3D video with a pose and a knowledge of a horizontal and vertical field of view to determine the viewport.

7. The apparatus of claim 6, wherein the renderer is configured to use the decoder metadata information for region-wise unpacking, projection de-mapping and rotation toward creating spherical content for each eye of a user. The VR Renderer uses the decoded signals and rendering metadata.

8. The apparatus of claim 2, wherein the processing circuitry is configured to control the RTP receiver, the HVEC decoder, the texture-to-sphere mapper, and the renderer based on media control information, dynamic user pose, and display and device capabilities using a display resolution, a maximum display refresh rate, a field of view in both horizontal and vertical directions, an eye-to-screen distance, a lens separation distance and operating system support.

9. The apparatus of claim 1, wherein the processing circuitry is further configured to negotiate Vital Product Data (VPD) capability, and the viewport switching latency metric includes latency and quality-related factors when viewport movement causes quality degradations, the latency and quality-related factors including viewport quality within a viewport.

10. The apparatus of claim 9, wherein the viewport quality is represented by a quality ranking (QR) value and a pixel resolution of one or more regions within the viewport.

11. The apparatus of claim 10, wherein the processing circuitry is further configured to determine whether the viewport has a comparable quality to another viewport, in response to more than one quality ranking region being visible inside the viewport, aggregated viewport quality factors are calculated as an area-weighted average QR and an area-weighted pixel resolution.

12. The apparatus of claim 11, wherein in response to movement of the viewport so that the viewport includes at least one new quality ranking region, the processing circuitry is configured to start a switch event.

13. The apparatus of claim 12, wherein:
- a list of quality factors related to a last evaluated viewport quality before the switch event are assigned to a firstViewport log entry,
- a start time of the switch event is set to a time of a last evaluated viewport before the switch event, and
- an end time for the switch event is when both the area-weighted average QR and the area-weighted pixel resolution for viewport reach values comparable to comparable values before the switch event, each value being comparable if the value is not more than a QR threshold or an effective resolution threshold worse than the value before the switch event.

14. The apparatus of claim 13, wherein the processing circuitry is further configured to:
- determine an occurrence of a timeout in response to the comparable values not being achieved within a period of time a timeout counter, and
- reset the timeout counter in response to an occurrence of a new switching event before the switch event has ended, an ongoing measurement process associated with the switch event configured to continue to evaluate the viewport quality until a comparable viewport quality value is achieved or the timeout occurs.

15. The apparatus of claim 13, wherein the processing circuitry is further configured to:
- assign the list of quality factors that fulfills both the QR threshold and the effective resolution threshold to a secondViewport log entry, and
- assign a latency to a latency log entry.

16. The apparatus of claim 13, wherein the processing circuitry is further configured to:
- send, to the memory for storage, a worst evaluated viewport during the switch event, the worst evaluated viewport being a viewport with a worst relative weighted average QR or relative effective resolution as compared to the values before the switch event, and
- assign the worst evaluated viewport to a worstViewport log entry.

* * * * *